(12) United States Patent
Toge et al.

(10) Patent No.: US 8,548,294 B2
(45) Date of Patent: Oct. 1, 2013

(54) OPTICAL FIBER CABLE AND OPTICAL FIBER RIBBON

(75) Inventors: Kunihiro Toge, Tsukuba (JP); Yusuke Yamada, Tsukuba (JP); Kazuo Hogari, Tsukuba (JP)

(73) Assignee: Nippon Telegraph and Telephone Corporation (JP)

( * ) Notice: Subject to any disclaimer, the term of this patent is extended or adjusted under 35 U.S.C. 154(b) by 353 days.

(21) Appl. No.: 12/996,761

(22) PCT Filed: May 18, 2009

(86) PCT No.: PCT/JP2009/059146
§ 371 (c)(1),
(2), (4) Date: Jan. 13, 2011

(87) PCT Pub. No.: WO2010/001663
PCT Pub. Date: Jan. 7, 2010

(65) Prior Publication Data
US 2011/0110635 A1 May 12, 2011

(30) Foreign Application Priority Data

Jun. 30, 2008 (JP) .................................. 2008-170986
Nov. 13, 2008 (JP) .................................. 2008-291341

(51) Int. Cl.
*G02B 6/44* (2006.01)
(52) U.S. Cl.
USPC ........................................................ 385/114
(58) Field of Classification Search
None
See application file for complete search history.

(56) References Cited

U.S. PATENT DOCUMENTS

| 5,802,236 | A | 9/1998 | DiGiovanni et al. |
| 6,584,257 | B1 * | 6/2003 | Hurley et al. ............... 385/109 |
| 6,973,246 | B2 * | 12/2005 | Bocanegra et al. ........ 385/113 |
| 2002/0044751 | A1 * | 4/2002 | Logan et al. ............... 385/113 |

FOREIGN PATENT DOCUMENTS

| JP | 05-281444 | 10/1993 |
| JP | 08-334662 | 12/1996 |
| JP | 2002-048955 | 2/2001 |
| JP | 2003-315639 | 11/2003 |
| JP | 2005-062427 | 3/2005 |
| JP | 2007-011019 | 1/2007 |
| JP | 2007-041568 | 2/2007 |
| JP | 2007-279226 | 10/2007 |
| JP | 2007279226 A * | 10/2007 |
| WO | WO 03/100495 A1 | 12/2003 |
| WO | WO 2006/098471 A1 | 9/2006 |
| WO | WO 2012165371 A1 * | 12/2012 |

OTHER PUBLICATIONS

Office Action dated Jun. 15, 2012 for corresponding Chinese Patent Application No. 200980121268.8 with English translation.

(Continued)

*Primary Examiner* — Sung Pak
(74) *Attorney, Agent, or Firm* — Ohlandt Greeley Ruggiero & Perle L.L.P.

(57) ABSTRACT

A mono-coated optical fiber that has a bending loss characteristic in which an optical loss increase at a bending radius 13 mm is 0.2 dB/10 turn or less, an optical fiber ribbon that includes two-dimensionally disposed resin portions for bonding the adjacent 2-fiber mono-coated optical fibers in plural places, the resin portions being disposed apart from each other in the longitudinal direction of the optical fiber ribbon and an optical fiber cable that includes a cable core portion that stores twisting of plural units where the mono-coated optical fibers constituting the optical fiber ribbon are collected.

25 Claims, 21 Drawing Sheets

(56) References Cited

OTHER PUBLICATIONS

International Search Report dated Jun. 9, 2009 for corresponding International Patent Application No. PCT/JP2009/059146 (w/ English translation).

"Optical fiber array V-groove board", Molitec Steel Co., Ltd. [online], search conducted on Sep. 17, 2008, Internet URL: http://www.moritex.co.jp/home/zigyo/pdf/b/zigoyo_b011.pdf, consisting of 1 page (w/ English translation).

Yamada, et al., "Fundamental study on small diameter and high-density one hundred optical fiber cable," B-13-32, Proceedings of the 2006 IEICE Communication Society Conference vol. 2, Sep. 7, 2006, pp. 339 (w/ English translation).

Toge, et al. "Ultra high-density and high fiber-count optical fiber cables with small diameters," B-13-7, Proceedings of the 2008 IEICE General Conference vol. 2, Mar. 5, 2008, pp. 453 (w/ English translation).

Kreger, et al., "High Resolution Distributed Strain or Temperature Measurements in Single- and Multi-mode Fiber Using Swept-Wavelength Interferometry," International Conference on Optical Fiber Sensors (OFS-18), paper ThE42, 2006, consisting of 4 pages.

Hogari, et al., "Technology of Ultra Large Capacity Optical-Fiber Transmission," Japan Soceity of Mechanical Engineers Magazine Life, Sep. 2004 Issue, vol. 107 No. 1,030, consisting of 3 pages (w/ English translation).

Internet Search conducted on May 7, 2008: http://www.optigate.jp/faq/index.html.

International Preliminary Report on Patentability for corresponding International Patent Application No. PCT/JP2009/059146 (with English translation), Jun. 9, 2009.

* cited by examiner

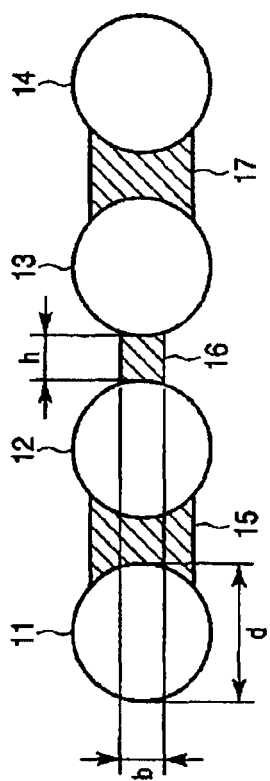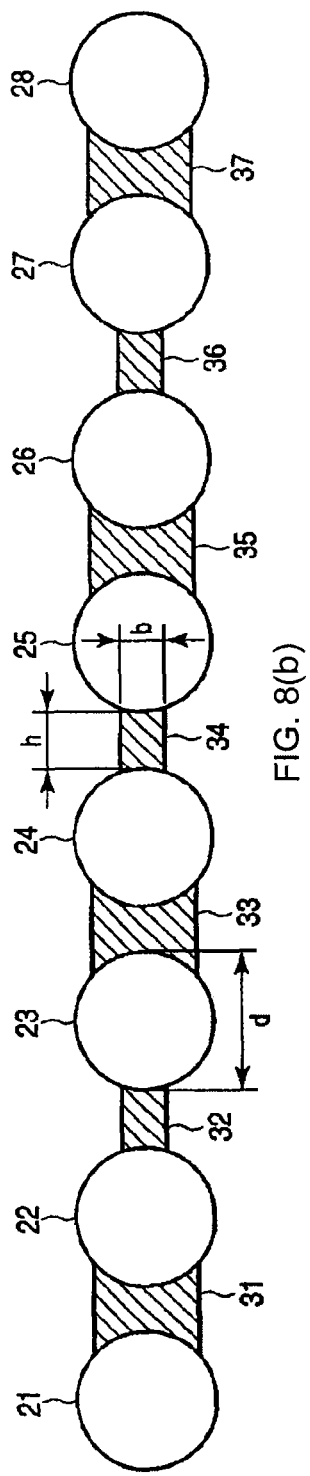

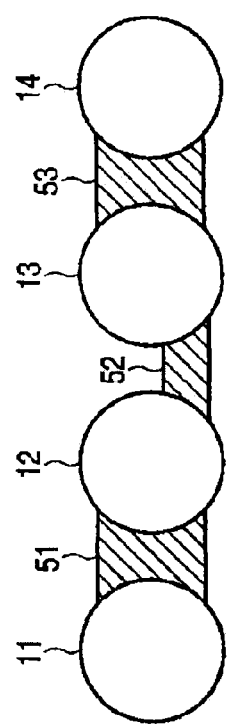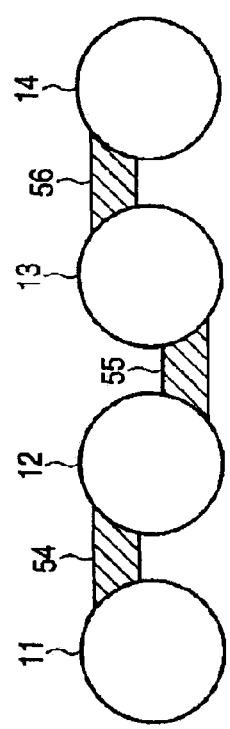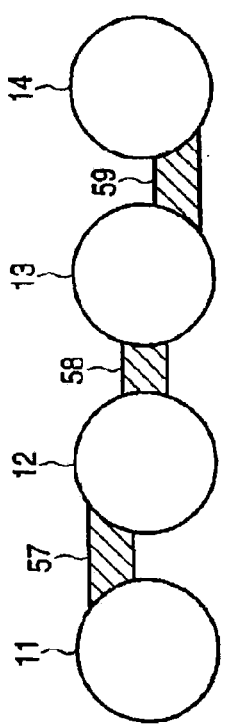

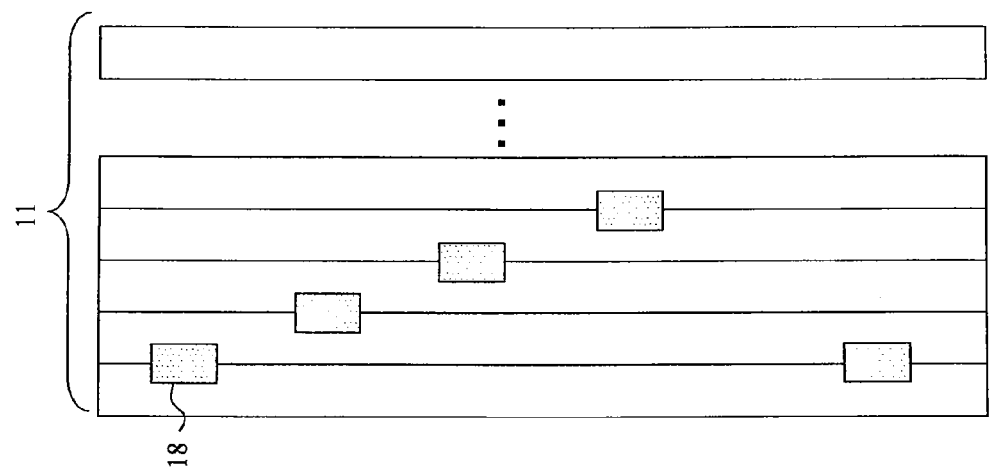

OPTICAL FIBER CABLE AND OPTICAL FIBER RIBBON

TECHNICAL FIELD

The present invention relates to an optical fiber ribbon and an optical fiber cable that are components of an information wiring line using an optical fiber indoors and outdoors.

BACKGROUND ART

At the present time, due to an increase in broadband services, the number of FTTH subscribers using an optical fiber rapidly increases. As a result, in maintenance of infrastructure such as a conduit line that lays an optical fiber cable, a space to additionally lay the optical fiber cable is insufficient. For this reason, if the optical fiber cable is constructed to have the minute diameter and the high density, this becomes very effective in making effective use of infrastructure equipment.

As the optical fiber cable that is constructed to have the small diameter and the high density, for example, Patent Document 1 suggests a multiple optical fiber cable that has the very small diameter and the high density using a structure in which sheathing is applied on the outer circumference of a bundle where optical fibers with low optical loss increase with respect to bending and mono-coated optical fibers coated at the outer circumference of the above optical fibers are collected. However, since the optical fiber cable described in Patent Document 1 uses the mono-coated optical fiber, when an optical fiber transmission path is constructed, optical fiber cables need to be connected to each other. Therefore the optical fiber cable described in Patent Document 1 has a problem that the number of times of connecting the optical fibers increases, which results in deteriorating connection efficiency.

Meanwhile, an optical fiber ribbon where the plural mono-coated optical fibers arranged in parallel are collectively coated is an optical fiber unit where collective connection is enabled by a mass-splicing machine, and is widely used in the conventional optical fiber cable. However, the conventional optical fiber ribbon has bending anisotropy in which it is difficult to bend the optical fiber ribbon in a width direction from the shape thereof. If the conventional optical fiber ribbon receives bending in the width direction in the optical fiber cable, large distortion or optical loss is generated in the optical fiber. For this reason, it is needed to use an optical fiber ribbon or cable structure that can suppress the distortion or optical loss.

Accordingly, optical fiber cables using an optical fiber ribbon having a new structure are suggested.

In all optical fiber cables that are described in Patent Documents 2 to 5, an optical fiber ribbon where plural mono-coated optical fibers are intermittently bonded in a longitudinal direction is used, and single fiber separating performance of separating only a desired optical fiber from the optical fiber ribbon at the time of intermediate post branching of the optical fiber cable is mainly improved.

The optical fiber cables that are described in Patent Documents 2 and 3 are stored in the cables in a staked state, using the optical fiber ribbon where resin portions bonding all parts of plural mono-coated optical fibers arranged in parallel in a width direction are intermittently disposed in a longitudinal direction.

The optical fiber cable that is described in Patent Document 4 is stored in the cable in a stacked state, using an optical fiber ribbon where the optical fiber cable is intermittently segmented in the course of manufacturing the conventional optical fiber ribbon and the segmented portions are deviated in the width direction along the longitudinal direction of the optical fiber ribbon. Also, it is described that if the segmented portions are disposed in a twist inversion portion of an optical fiber cable with an SZ-slotted rod, warping of the optical fiber can be reduced, with respect to bending of the width direction received when the optical fiber ribbon is manufactured.

The optical fiber cable uses an optical fiber ribbon in which the resin portions bond two adjacent single-core coated optical fibers of the mono-coated optical fiber, the length of the resin portions is shorter than the length of non-bonded portions, and the resin portions adjacent in the width direction are disposed away from each other, and is folded in the cables and stored. Since the optical fiber ribbon has small bending anisotropy and is easily folded in a cylindrical shape, an optical fiber cable that has the small diameter and the high density can be manufactured, similar to the bundle of mono-coated optical fibers.

PRIOR ART DOCUMENT

Patent Document

Patent Document 1: Japanese Patent Application Laid-Open (JP-A) No. 2007-41568
Patent Document 2: JP-A No. 5-281444
Patent Document 3: JP-A No. 8-334662
Patent Document 4: JP-A No. 2005-62427
Patent Document 5: JP-A No. 2003-315639
Patent Document 6: JP-A No. 2007-279226
Non-Patent Document
Non-patent Document 1: S. T. Kreger et al., International Conference on Optical Fiber Sensors (OFS-18), paper ThE42, 2006
Non-patent Document 2: Japan Society of Mechanical Engineers magazine machine life September, 2004 issue Vol. 107 No. 1,030, special feature: Technology of Ultra Large Capacity Optical-Fiber Transmission
Non-patent Document 3: Internet search [May 7, 2008 search] http://www.optigate.jp/faq/index.html
Non-patent Document 4: "Optical fiber array V-groove board", Molitec Steel Co., Ltd., [online], [Sep. 17, 2008 search], Internet URL:http://www.moritex.co.jp/home/zigyo/pdf/b/zigyo_b011.pdf

DISCLOSURE OF INVENTION

Problem to be Solved by the Invention

Since the optical fiber cable is laid in the conduit having bending and is used during a long period, it is needed to maintain a stable optical loss characteristic with respect to the external force applied to the cable. Further, it is needed to secure sufficient long-term reliability by making large warping not applied to the optical fiber, even in some cable bending radius.

However, when the conventional art is used to provide an optical fiber cable with excellent connection efficiency and the small diameter and the high density, the following problems are generated such as both a stable optical loss characteristic and long-term reliability that are requirements of the optical fiber cable cannot be secured.

Specifically, in the optical fiber cables that are described in Patent Documents 2 to 4, the intermittently bonded optical fiber ribbons are stored in a cable core portion in a stacked condition. If the optical fiber ribbons are stored in the stacked condition, because large void portions are generated in the cable, it is overwhelmingly advantageous to use a bundle of mono-coated optical fibers to increase the mounting density of the cable core portion. For this reason, the optical fiber cables that are described in Patent Documents 2 to 4 are not suitable for the optical fiber cable with the small diameter and the high density.

The optical fiber cables that are described in Patent Documents 2 to 4, have resin portions where all or the 3-fiber or more optical fiber ribbons are bonded in the width direction exist. When the optical fiber ribbons are forcedly stored in the cable core portion with the high density in the stacked condition, since the resin portions have large bending anisotropy, locally large optical loss or warping is generated when the cable is manufactured or bent. For this reason, the optical fiber cables that are described in Patent Documents 2 to 4 are insufficient for a stable optical loss characteristic and sufficient long-term reliability.

In the optical fiber cable that is disclosed in the final document of the background art, the bending anisotropy of the optical fiber ribbons described above is reduced, and the optical fiber ribbons can be stored with the same mounting density as that of when a bundle of mono-coated optical fibers is used. Therefore, the mounting density of the cable core portion can be maximized. However, there is a problem that when the optical fiber ribbons are mounted with the high density, the optical loss increase due to the random bending that is applied to the optical fiber when the optical fiber cable is manufactured or the optical loss increase due to bending of the optical fiber in the cable with respect to the bending or the lateral pressure applied to the cable is generated, and a stable optical loss characteristic cannot be maintained. Furthermore, there is another problem that, in regards to the warping that is applied to the bending of the cable, the warping exceeding an allowed value is applied to the optical fiber according to a bonding state of the mono-coated optical fibers in the optical fiber ribbons used in the cable, and reliability cannot be secured during a long period.

The present invention has been made in view of the above circumstances, and a first object of the invention is to provide an optical fiber cable that has superior connection efficiency of optical fibers, prevents an optical loss increase generated in the optical fibers to obtain a stable optical loss characteristic, sufficient long-term reliability by reducing warping applied to the optical fibers, and is mounted to have the small diameter and the high density.

The optical fiber ribbons that are used in the optical fiber cables described in Patent Documents 2 to 4 and 6 have an intermittently bonded structure. As compared with the conventional optical fiber ribbons that are continuously manufactured in a longitudinal direction, it is needed to intermittently apply the resin or provide a segmenting mechanism in a manufacturing device, and the manufacturing speed is low. As a result, there is a problem that a manufacturing cost increases.

The invention has been made in view of the above circumstances, and a second object of the invention is to provide an optical fiber ribbon and an optical fiber cable with the small diameter and the high density that can form connecting portions connecting adjacent mono-coated optical fibers to have the thickness and the length enabling easy buckling against the external force applied in a width direction of an optical fiber ribbon, thus can reduce bending anisotropy of the optical fiber ribbon, and secure sufficient long-term reliability without generating excessive distortion at the time of bending.

Means for Solving the Problems

In order to achieve the first object, the present invention provides an optical fiber cable that includes optical fiber ribbons composed of 3-fiber or more mono-coated optical fibers coated at the outer circumference of optical fibers. The optical fiber has a bending loss characteristic in which an optical loss increase at the time of being bent with a radius of 13 mm at the wavelength of 1.55 µm becomes 0.2 dB/10 turn or less. The optical fiber ribbons two-dimensionally dispose plural of resin portions bonding the adjacent 2-fiber mono-coated optical fibers in plural places in a longitudinal direction and a width direction. The length of the resin portion that bonds the adjacent 2-fiber mono-coated optical fibers is shorter than the length of a non-resin portion that does not bond the adjacent 2-fiber mono-coated optical fibers. The resin portions that are adjacent to each other in the width direction of the optical fiber ribbons are disposed apart from each other in the longitudinal direction of the optical fiber ribbons. The optical fiber cable includes a cable core portion that stores twisting of plural units where the plural mono-coated optical fibers constituting the optical fiber ribbons are collected, and a sheath that is applied to the outer circumference of the cable core portion. A ratio of a sectional area occupied by the plural mono-coated optical fibers to a sectional area of the cable core portion is 0.3 or more.

In order to achieve the second object, the invention provides an optical fiber ribbon that has, in a longitudinal direction, (n−1) (n is plural) connecting portions continuously connecting adjacent n (n is plural) mono-coated optical fibers disposed not to contact each other. In at least (n/2−1) connecting portions, when the thickness of each connecting portion is set to b and the outer diameter of each mono-coated optical fiber is set to d, a relation between b and d is b≤d, and the length h of each connecting portion is in a range of $100(b/d)^2 \le h \le 312.5-d$ (where a unit is µm).

In the optical fiber ribbon of the invention, resin that has the Young's modulus after hardening less than 500 MPa is used as a material of at least (n/2−1) connecting portions among the plural connecting portions.

In the optical fiber ribbon of the invention, a layer that has the same material as the connecting portions is formed around the mono-coated optical fibers.

In the optical fiber ribbon of the invention, the connecting portions are disposed to be shifted in a thickness direction of the optical fiber ribbon more than a line connecting the centers of the mono-coated optical fibers.

In the optical fiber ribbon of the invention, a photonic crystal fiber that has a hole in a clad portion of an optical fiber is used as the optical fiber.

The invention provides an optical fiber cable in which the plural optical fiber ribbons are collected and stored.

The invention provides an optical fiber cable that has a cable core portion that stores twisting of plural units where the plural optical fiber ribbons are collected and a sheath that is applied to the outer circumference of the cable core portion. A ratio of a sectional area occupied by the plural mono-coated optical fibers to a sectional area of the cable core portion is 0.3 or more.

In the optical fiber cable of the invention, two strength members are buried in the sheath to be disposed symmetrical to each other with respect to the center of the optical fiber cable, and the thickness of the sheath of a portion where the strength members are buried is larger than the thickness of the sheath of the other portion.

EFFECTS OF THE INVENTION

The optical fiber cable according to the present invention can maintain a stable optical loss characteristic with respect to the external force applied during use, in the mounting density of the cable core portion that is almost equal to that of the optical fiber cable using the mono-coated optical fibers, reduce the warping applied to the optical fiber with respect to the cable bending, and secure sufficient long-term reliability. Since collective connection using the optical fiber ribbons is enabled, the optical fiber cable according to the invention has an effect that connection efficiency is high. Furthermore, it has an effect that identification or extraction of a desired optical fiber is superior, and single fiber separability at the time of intermediate post branching is superior.

In the optical ribbon according to the invention, the connecting portion that connect the adjacent mono-coated optical fibers are configured to have the thickness and the length in which the connecting portion can be easily buckled with respect to the external force applied in the width direction of the optical fiber ribbon, thereby, the connecting portion is easily buckled with respect to the external force applied in the width direction of the optical fiber ribbon. Therefore, bending anisotropy of the optical fiber ribbon can be greatly decreased, sufficient long-term reliability can be secured without generating excessive distortion even when the cable is bent. Furthermore, it has effects that collective connection of the multiple fibers is also enabled, the manufacturing speed of the optical fiber ribbon is high, and the manufacturing is economical.

BRIEF DESCRIPTION OF THE DRAWINGS

FIG. 8(a) is a cross-sectional view showing an example of an optical fiber ribbon according to a first embodiment of the invention.

FIG. 8(b) is a cross-sectional view showing another example of the optical fiber ribbon according to the first embodiment of the invention.

FIGS. 11(a), (b), and (c) are cross-sectional views showing an example of an optical fiber ribbon according to a third embodiment of the invention.

FIGS. 17(a), 17(b) and 17(c) are diagrams showing an arrangement pattern patterns of resin portions in an optical fiber ribbon that is included in an optical fiber cable according to the invention.

BEST MODE FOR CARRYING OUT THE INVENTION

Figure 2:
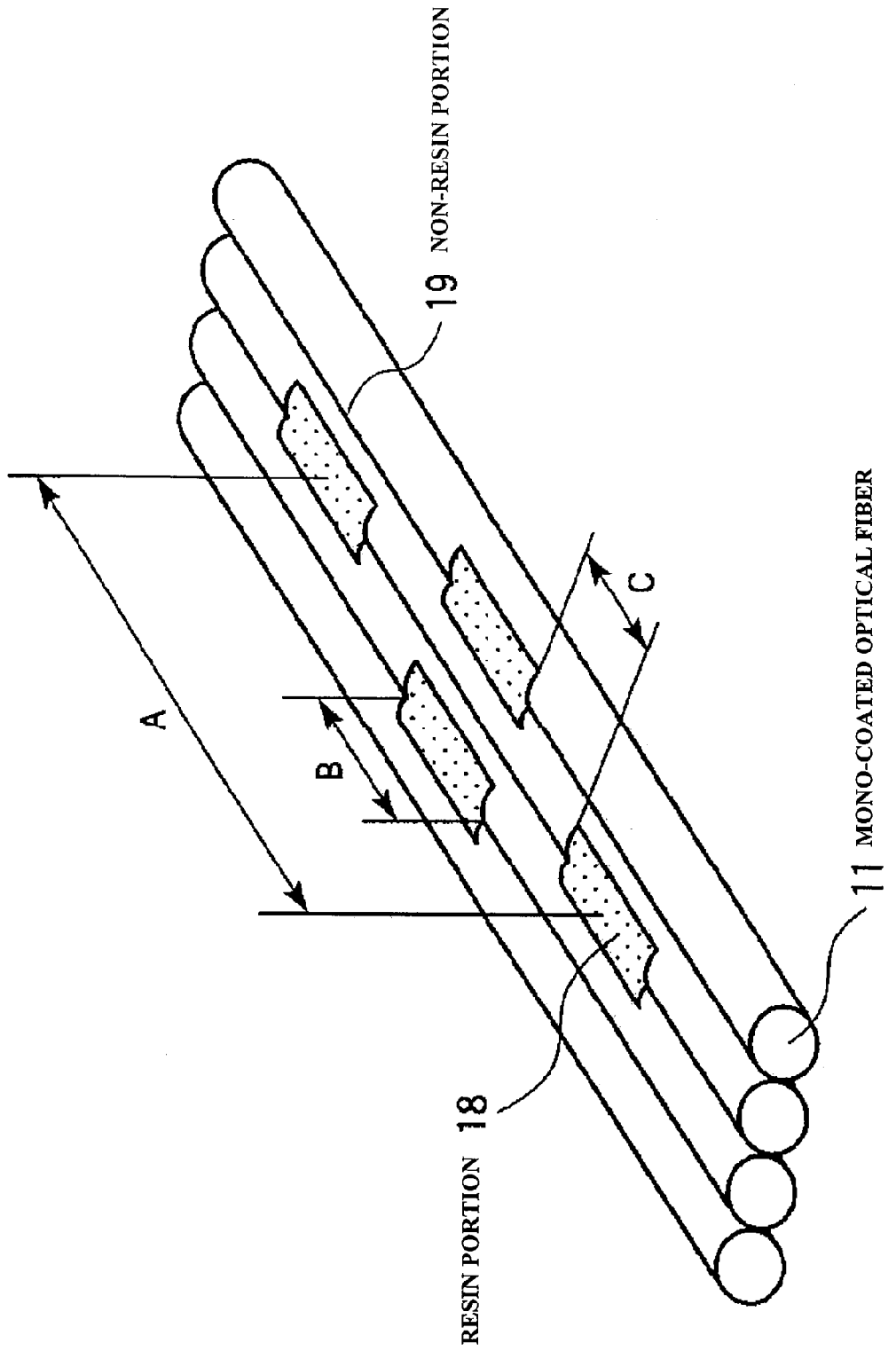
FIG. 2 is a schematic perspective view showing an optical fiber ribbon according to the embodiment of the invention.

Embodiments of the present invention will be described with reference to the accompanying drawings. The embodiments to be described below are examples of the invention and the invention is not limited thereto. In the present specification and the drawings, components that are denoted by the same reference numerals are equal to each other. Also, in the specification, a material that is obtained by connecting mono-coated optical fibers 11 disposed in parallel as shown in FIG. 2 by resin portions 18 is represented as an optical fiber ribbon, and a material that is obtained by connecting mono-coated optical fibers 11 to 14 and 21 to 28 by connecting portions 15 to 17 and 31 to 37 as shown in FIG. 8 is represented as an optical fiber ribbon.

First Embodiment

Figure 1:
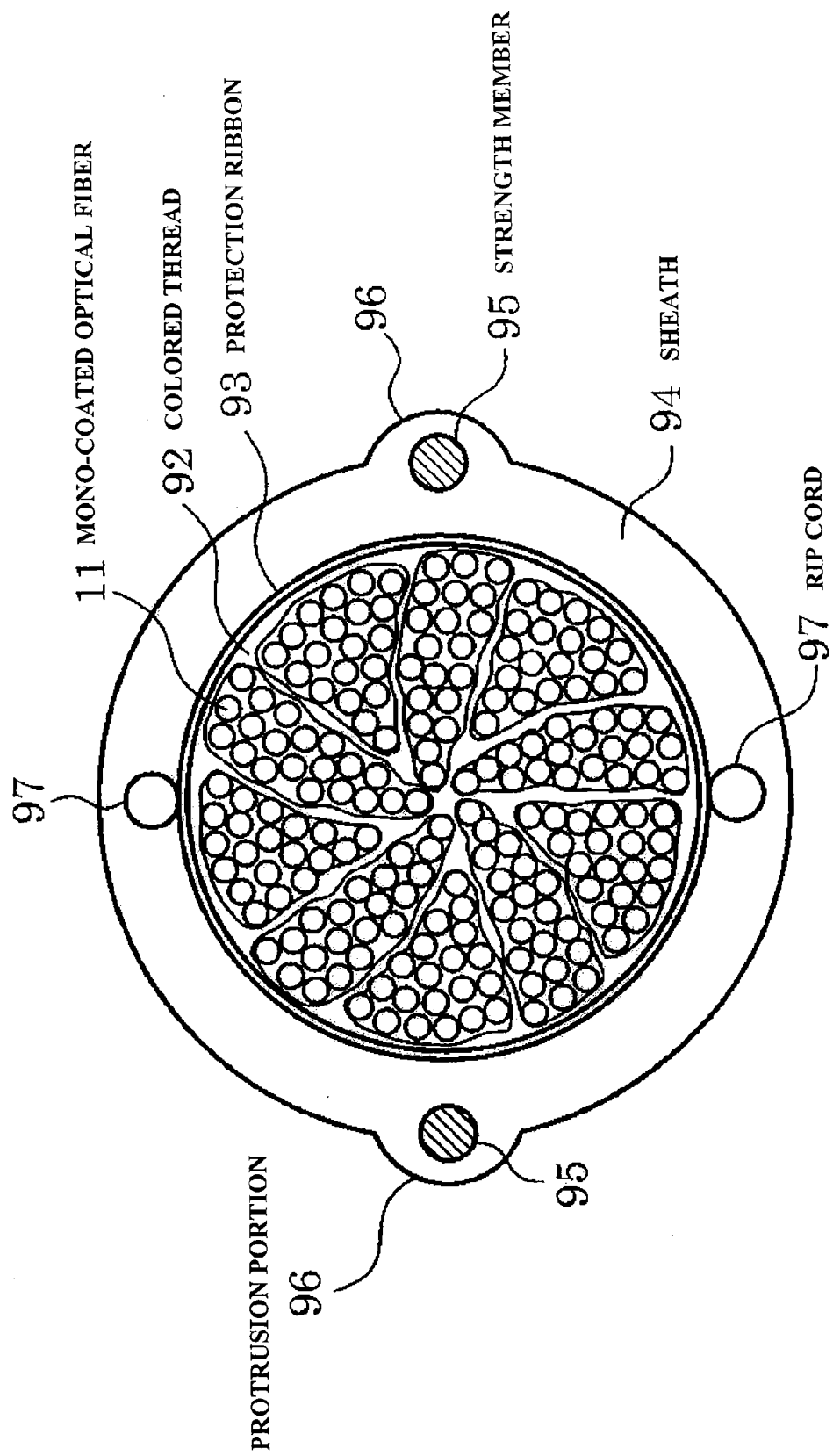
FIG. 1 is a cross-sectional view showing an optical fiber cable according to an embodiment of the present invention.

FIG. 1 is a cross-sectional view showing an optical fiber cable according to an embodiment of the present invention. In FIG. 1, 11 denotes a mono-coated optical fiber, 92 denotes a colored thread, 93 denotes a protection ribbon, 94 denotes a sheath, 95 denotes a strength member, 96 denotes a protrusion portion, and 97 denotes a rip cord.

As shown in FIG. 1, a unit that is configured by winding a colored thread 92 around the outer circumference of an optical fiber bundle where plural mono-coated optical fibers 11 with the diameter of 0.25 mm, for example, 20 mono-coated optical fibers are straightly and densely collected is formed, a wrapping layer that is composed of plural thin protection ribbons 93 is provided on the outer circumference of the optical fiber bundle where the plural units, for example, 10 units are twisted in one direction and densely collected, a sheath 94 is applied to the outer circumference, and a 200- fiber multiple optical fiber cable with the very high density is configured. The unit is configured using the optical fiber ribbon that is composed of the 3-fiber or more mono-coated optical fibers where coating is applied to the outer circumference of the optical fibers. That is, the multiple optical fiber cable includes a cable core portion that stores the plural twisted units and the sheath 94 that is applied to the outer circumference of the cable core portion. The sheath 94 is formed of, for example, polyethylene.

The optical fiber cable of FIG. 1 has a protrusion portion 96 that is buried in the sheath 94, such that two strength members 95 are symmetrical to each other with respect to the center of the optical fiber cable, and the thickness of the sheath 94 of the protrusion portion 96 becomes larger than the thickness of the sheath 94 other than the protrusion portion 96. In this embodiment, the strength member 95 is composed of, for example, steel wire with the diameter of 0.95 mm. In intermediate portions of the strength members 95 of the sheath 94, rip cords 97 are provided at the positions symmetrical to each other, with respect to the center of the optical fiber cable. The rip cord 97 is provided to cut the sheath 94 and extract the mono-coated optical fiber 11.

In regards to the outer diameter of the optical fiber cable according to the embodiment of the present invention, the long diameter that is measured by the protrusion portion 96 is, for example, 11.7 mm, the short diameter D that is measured at portions other than the protrusion portion 96 is, for example, 9.7 mm, and the thickness of the sheath 94 other than the protrusion portion 96 is, for example, 1.9 mm. A sectional area Acore of the portion where the optical fiber 11 is stored, that is, the cable core portion is, for example, 27.3 mm², and a sectional area Afiber that is occupied by the 200-fiber mono-coated optical fibers 11 is calculated from the following relationship.

$$A\text{fiber} = n \times (d/2)^2 \times \pi \quad (1\text{-}1)$$

In this case, n means the number (=200) of optical fibers 11 in the optical fiber cable, d means the standard outer diameter (=0.25 mm) of the mono-coated optical fiber 11, and π means a circumstance ratio. Accordingly, the sectional area Afiber that is occupied by the plural mono-coated optical fibers 11 according to this embodiment becomes 9.82 mm². A ratio of the sectional area Afiber occupied by the plural mono-coated optical fibers 11 with respect to the sectional area Acore of the cable core portion becomes Afiber/Acore≈0.36. When optical fiber cables having the difference number of optical fibers are manufactured in the same structure in actuality, Afiber/Acore is about 0.3 to 0.55 in 100-fiber to 1000-fiber optical fiber cables. Accordingly, in this embodiment, a ratio of the sectional area occupied by the plural mono-coated optical fibers with respect to the sectional area of the cable core portion is 0.3 or more.

In the conventional optical fiber cable in which the cable core portion is formed using a currently used slot (for example, a rod made of polyethylene in which a spiral groove to store an optical fiber unit is formed on a surface), for example, in a 200-fiber optical fiber cable, Afiber/Acore is about 0.1. The optical fiber cable according to the embodiment of the invention is different from the conventional optical fiber cable in that Afiber/Acore is larger than that of the conventional optical fiber cable by three times or more, and it can be seen that the optical fiber cable according to the embodiment of the invention has a characteristic that the fiber density is extraordinarily high.

A sectional shape of the optical fiber cable according to the embodiment of the invention may be circular, because the optical fiber cable does not need to have the protrusion portion 96 on the sheath 94. The number n of optical fibers 11 in the optical fiber cable is about a normal number of 10 to 100. The standard outer diameter d of the mono-coated optical fiber 11 is not limited to 0.25 mm, and may be the different outer diameter, such as the currently used outer diameter of 0.5 mm or 0.9 mm.

In the above description, the 10 units are twisted in one direction, but the invention is not limited thereto. For example, the optical fiber cable may be an optical fiber cable with an SZ-slotted rod that has an untwisted portion in an opposite direction.

In the embodiment of the invention, in a state where the outer diameter (short diameter when the sectional shape is not circular) is defined as D and the optical fiber cable is bent at a bending radius 10 D, a maximum value of warping that is applied in a longitudinal direction of the optical fiber is 0.2% or less.

Figure 3:
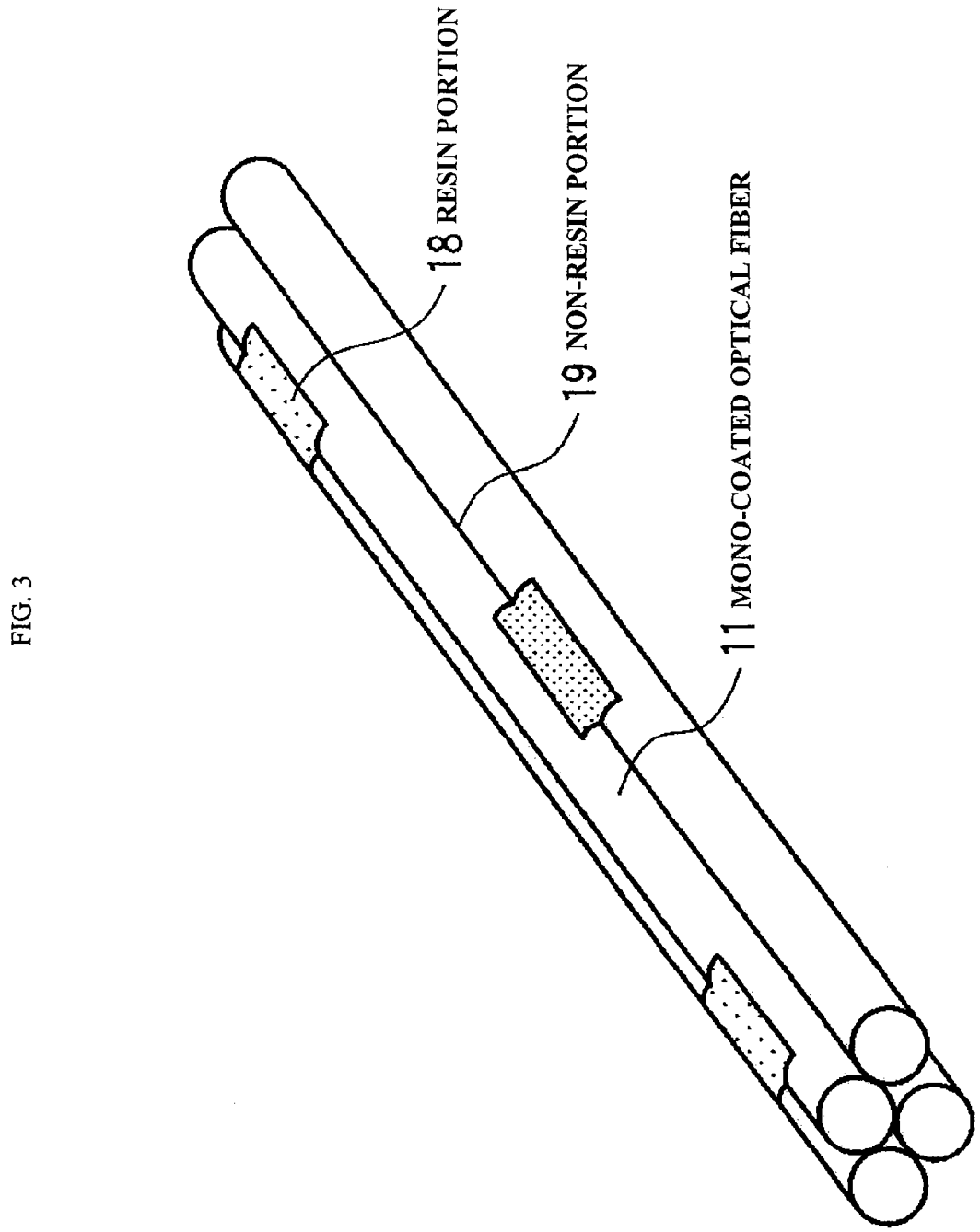
FIG. 3 is a schematic perspective view showing a folded state of an optical fiber ribbon according to the embodiment of the invention.

FIG. 2 is a schematic perspective view showing an optical fiber ribbon according to the embodiment of the invention. FIG. 3 is a schematic perspective view showing a folded state of an optical fiber ribbon according to the embodiment of the invention. In FIGS. 2 and 3, 18 denotes a resin portion, and 19 denotes a non-resin portion.

As shown in FIG. 2, the optical fiber ribbon that constitutes the optical fiber cable includes 3-fiber or more, for example, 4-fiber mono-coated optical fibers 11 and resin portions 18 of plural places that connect the adjacent 2-fiber mono-coated optical fibers 11, and the resin portions 18 are two-dimensionally disposed in plural places in a longitudinal direction and a width direction. By bonding only the adjacent 2-fiber mono-coated optical fibers 11, the bending anisotropy is reduced, as compared with the structures where all or the 3-fiber mono-coated optical fibers in the width direction of the optical fiber ribbon described in Patent Documents 2 to 4 are bonded.

In the resin portion 18, an ultraviolet curing resin, a thermoplastic resin or a thermosetting resin that bonds the mono-coated optical fibers 11 can be used. In order to provide discrimination of the optical fiber ribbon, the resin portion 18 may be colored. The case where the optical fiber ribbon stands the N (N is a multiple of 8) mono-coated optical fibers 11 in line will be described. The mono-coated optical fibers 11 are grouped for every 8 mono-coated optical fibers. The resin portion 18 is colored with a different color, for each group. For example, the resin portion 18 that connects the mono-coated optical fibers 11 of a first group is colored with a red color, the resin portion 18 that connects the mono-coated optical fibers 11 of a second group is colored with a yellow color, the resin portion 18 that connects the mono-coated optical fibers 11 of a third group is colored with a blue color, and so on. In order to allow the each group to be easily identified, each group preferably adopts the resin portion 18 of a color of a different system. Further, the color of the resin portion 18 that connects the mono-coated optical fibers 11 between the groups is set to, for example, black and thus discrimination of each group can be improved. Only the color of the resin portion 18 that connects the mono-coated optical fibers 11 between the groups may be set to be different from the color of the resin portion 18 that connects the mono-coated optical fibers 11 in each group. If the colors are distributed to the resin portions 18, the optical fiber ribbon can maintain identification performance to identify each group. A worker can easily know the number of mono-coated optical fibers arranged in line in the optical fiber ribbon, using the identification performance.

In the optical fiber ribbon shown in FIG. 2, a length B of the resin portion 18 that bonds the adjacent 2-fiber mono-coated optical fibers 11 is shorter than a length A-B of a non-resin portion 19 that does not bond the adjacent 2-fiber mono-coated optical fibers 11. In this embodiment, an interval A of the resin portions 18 that are disposed in a longitudinal direction of the mono-coated optical fibers 11 is about 200 mm, and the length B of the resin portion is about 80 mm. That is, in this embodiment, a ratio of the length of the resin portion 18 with respect to the interval of the resin portions 18 that are disposed in the longitudinal direction of the mono-coated optical fiber 11 is 0.4 or less, and the length of the resin portion 18 is 80 mm or less. As a material of the resin portion 18, a material that has a Young's modulus smaller than that of a material used in an outermost sheath layer of the mono-coated optical fiber 11.

Also, the resin portions 18 that are adjacent to each other in a width direction of the optical fiber ribbons are disposed to be apart from each other in a longitudinal direction of the optical fiber ribbons.

As shown in FIG. 2, the resin portions 18 are disposed such that a portion where the resin portions do not exist in the width direction of the optical fiber ribbon. This is because that, since the adjacent resin portions 18 are disposed not to be affected each other, as shown in FIG. 3, the optical fiber ribbon is easily folded, and the ratio of the area occupied by the mono-coated optical fiber 11 to the area of the cable core portion, that is, Afiber/Acore is easily increased. A length C of the portion where the resin portions 18 do not exist in the width direction of the optical fiber ribbon is preferably 50 mm or less. Since a cut portion is unclear, when the optical fiber cable is used, a situation in which the portion where the resin portions 18 do not exist in the width direction of the optical fiber ribbon is disposed at a tip of the optical fiber ribbon is a situation where it is the most difficult to arrange the plural mono-coated optical fibers 11 in a plane when the optical fiber ribbon is connected. For this reason, from a viewpoint of securing constant connection efficiency, the length of the portion where the resin portions 18 do not exist in the width direction of the optical fiber ribbon needs to be shorter than the length (about 50 mm) of an optical fiber holder used at the time of general optical fiber mass splicing, and at least one resin portion 18 needs to exist.

In this embodiment, the optical fiber ribbon that includes the 4-fiber mono-coated optical fibers 11 each other and the resin portions 18 to connect the mono-coated optical fibers 11 is described, but the invention is not limited thereto. For example, the optical fiber ribbon may include mono-coated optical fibers of the different number, for example, 8-fiber mono-coated optical fibers and resin portions.

Figure 17A:
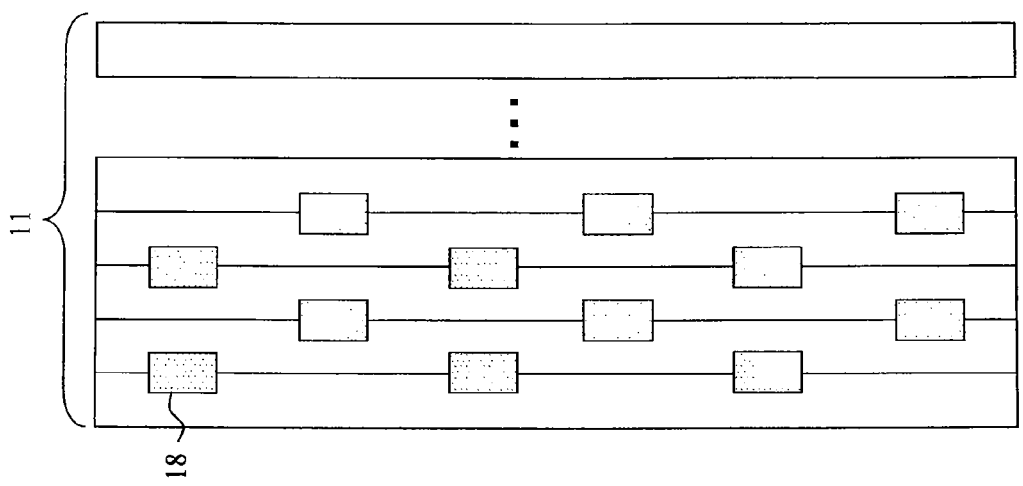
Figure 17B:
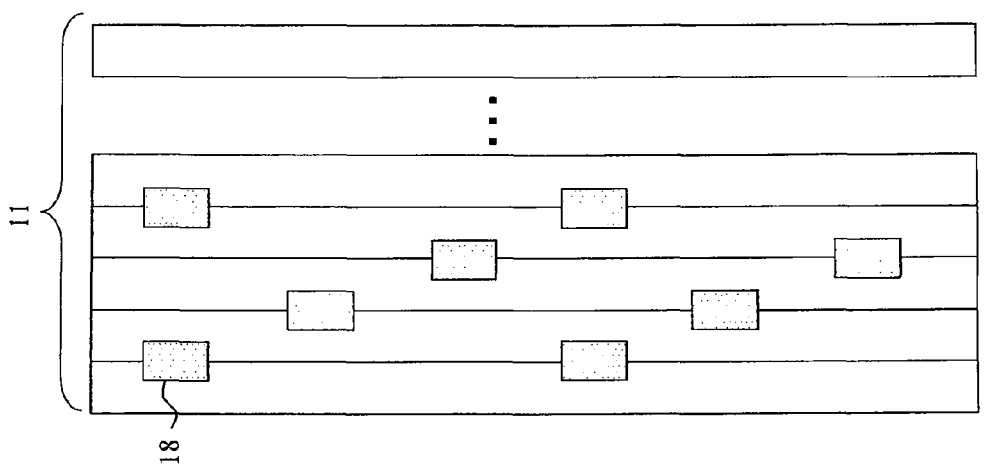

FIGS. 17(a), 17(b) and 17(c) are diagrams showing arrangement patterns of resin portions in an optical fiber ribbon according to the embodiment. FIG. 17(a) shows an optical fiber ribbon in which the resin portion 18 that bonds the two adjacent mono-coated optical fibers 11, for example, the n-th mono-coated optical fiber 11 and the (n+1)-th mono-coated optical fiber 11 exists, and another resin portion 18 exists between the (n+2)-th mono-coated optical fiber 11 and the (n+3)-th mono-coated optical fiber 11, in the width direction of the optical fiber ribbon of the resin portion 18. FIG. 17(b) shows an optical fiber ribbon in which the resin portion 18 that bonds the n-th mono-coated optical fiber 11 and the (n+1)-th mono-coated optical fiber 11 exists, and another resin portion 18 exists between the (n+3)-th mono-coated optical fiber 11 and the (n+4)-th mono-coated optical fiber 11, in the width direction of the optical fiber ribbon of the resin portion 18. The above another resin portion 18 may exist between the (n+4)-th mono-coated optical fiber 11 and the (n+5)-th mono-coated optical fiber 11 at an arrangement interval between the resin portion 18 and the another resin portion 18, or the arrangement interval may be increased. FIG. 17(c) shows an optical fiber ribbon in which only one resin portion 18 exists in the width direction of the optical fiber ribbon. The optical fiber cable according to this embodiment may include the optical fiber ribbon of any of FIGS. 17(a), 17(b) or 17(c).

Figure 14:
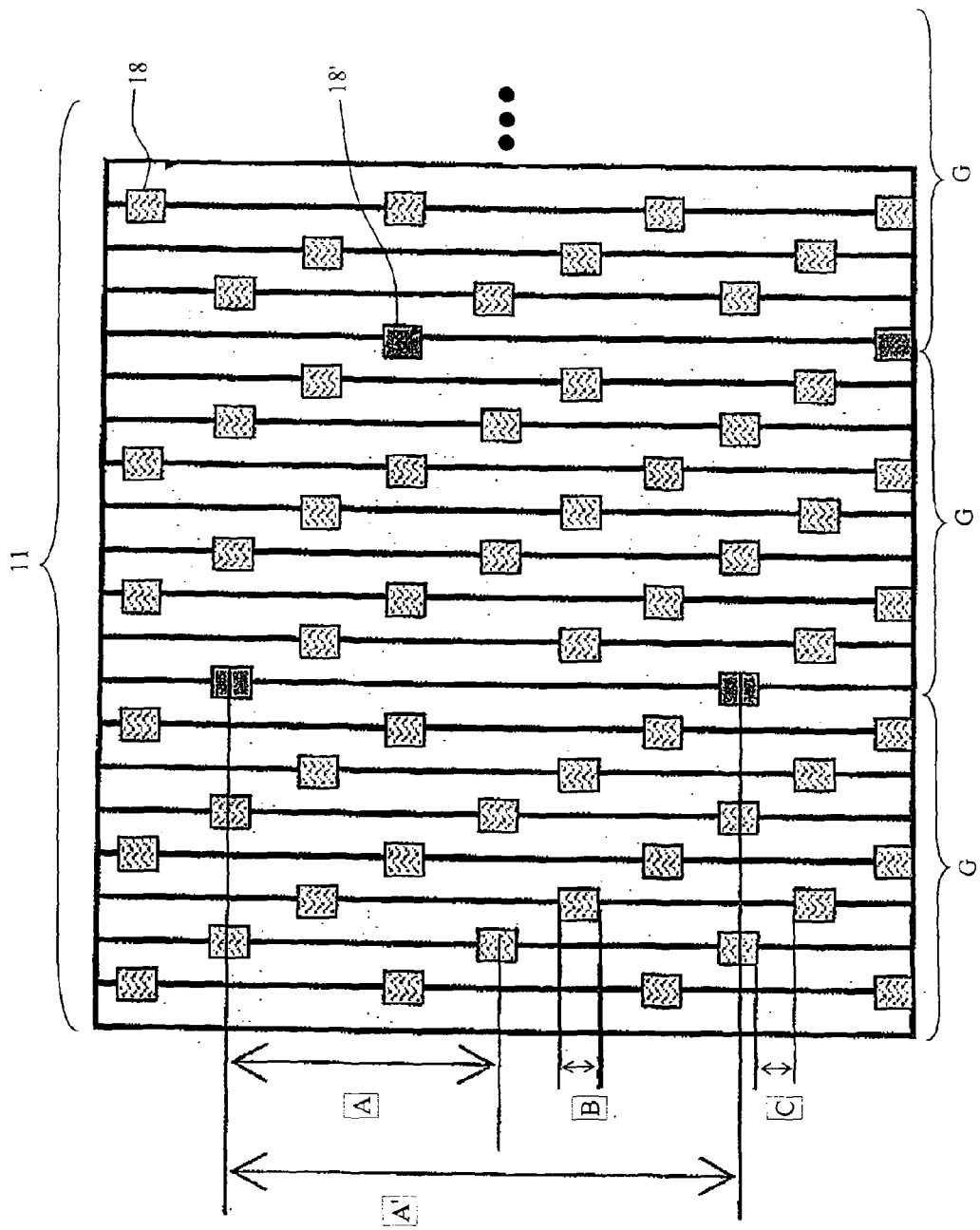
FIG. 14 is a diagram showing an optical fiber ribbon having different arrangement intervals of resin portions.

For example, the length of the resin portion that is disposed between the first optical fiber and the second optical fiber of the 4-fiber mono-coated optical fibers arranged in parallel or the arrangement interval may be different from the length of the resin portion that is disposed between the second optical fiber and the third optical fiber of the 4-fiber mono-coated optical fibers or the arrangement interval. In this case, the arrangement interval needs to be set, such that the resin portions are not adjacent to each other in the width direction of the optical fiber ribbon. FIG. 14 is a diagram showing an optical fiber ribbon having two arrangement intervals of resin portions 18. Assume that the mono-coated optical fibers 11 are grouped for every 8 mono-coated optical fibers. The optical fiber ribbon has two types of arrangement intervals. Specifically, an arrangement interval A' of the resin portions 18' that are disposed between the 8n-th (n is a natural number) mono-coated optical fiber 11 and the 8(n+1)-th mono-coated optical fiber 11, that is, the resin portions 18' that are disposed between the groups is different from an arrangement interval A of the resin portions 18 in a group G. By setting the arrangement intervals of the resin portions in the above way, the optical fiber ribbon can maintain the identification performance to identify the group G. For example, since the multiple optical fiber ribbon composed of the N optical fibers can easily identify the group G (sub-unit ribbon) of an arbitrary unit, an operation and connection in an optical fiber number unit of the group G (sub-unit ribbon) becomes easy by separating the optical fibers by the resin portions 18'.

In this embodiment, as the optical fiber, a photonic crystal fiber that has a hole in the clad portion of the optical fiber can be used.

Next, the optical loss characteristic of the optical fiber cable according to the embodiment of the invention will be described in detail.

Figure 4:
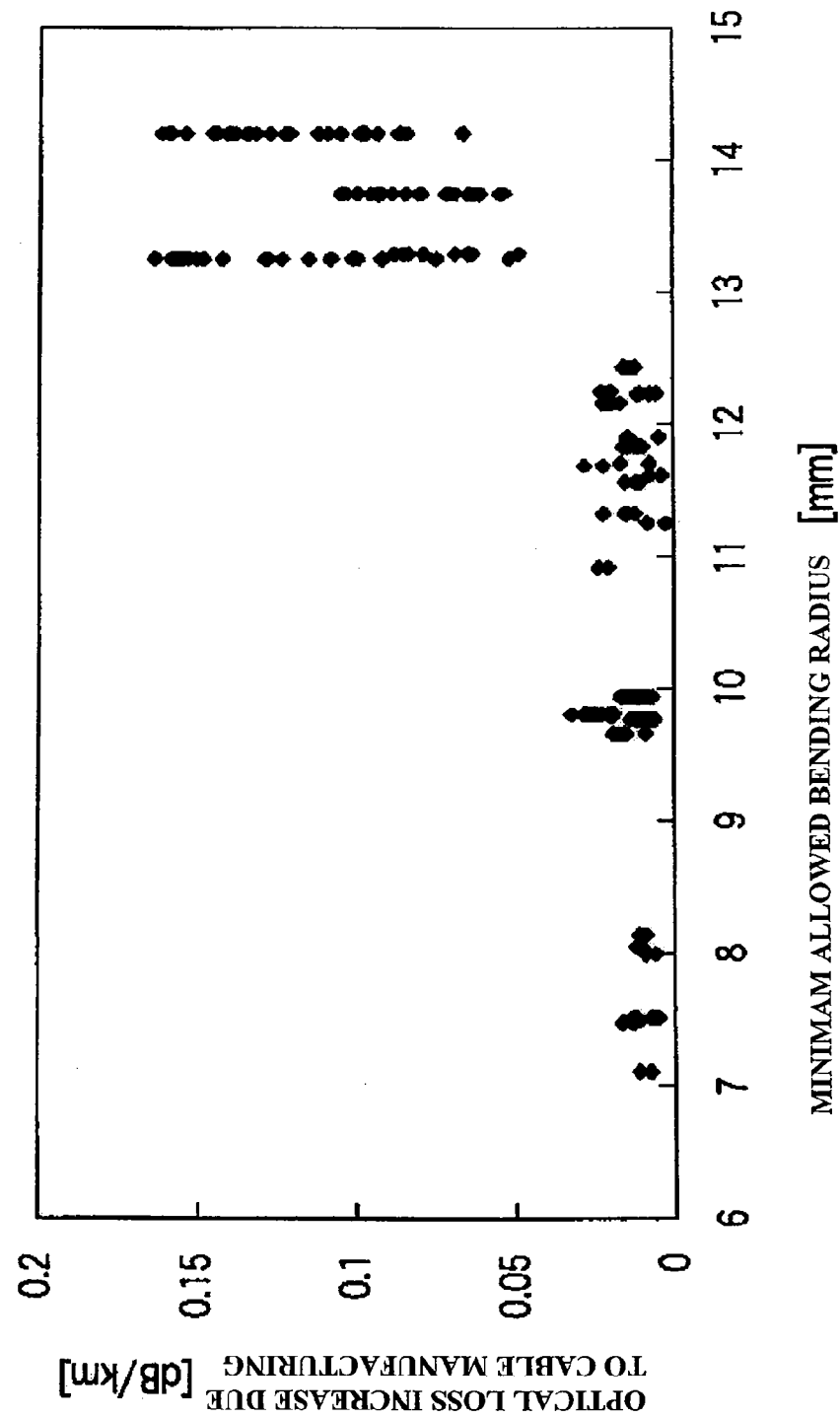
FIG. 4 is a characteristic view showing a measured result of a relationship between an optical loss increase at the time of manufacturing an optical fiber cable and a bending loss characteristic of an optical fiber used, according to the embodiment of the invention.

FIG. 4 is a characteristic view showing a measured result of a relationship between an optical loss increase at the time of manufacturing an optical fiber cable and a bending loss characteristic of an optical fiber used according to the embodiment of the invention. The bending loss characteristic of the optical fiber is represented by a minimum allowed bending radius (bending radius that becomes 0.2 dB/10 turn at the wavelength of 1.55 μm), and is calculated experimentally from a bending test of the optical fiber. In the optical fiber cable according to this embodiment, plural kinds of optical fibers that have various minimum allowed bending radiuses are mounted. The bending loss characteristic in this embodiment is acquired by a measuring method defined in "IEC 60793-1-47 edition2 (2006-09) "Optical fibers-part1-47 Measurement methods and test procedure-Macrobending loss".

It can be seen from FIG. 4 that the optical loss rapidly increases at the time of manufacturing the optical fiber cable, when the minimum allowed bending radius of the optical fiber increases, that is, loss resistance against bending of the optical fiber decreases. This is because of random warping applied to the optical fiber at the time of manufacturing the optical fiber cable. By using the optical fiber where the minimum allowed bending radius is about 13 mm or less, the optical loss increase at the time of manufacturing the optical fiber cable according to this embodiment can be suppressed, and the optical loss increase is not suppressed in the other optical fiber cables.

Figure 5:
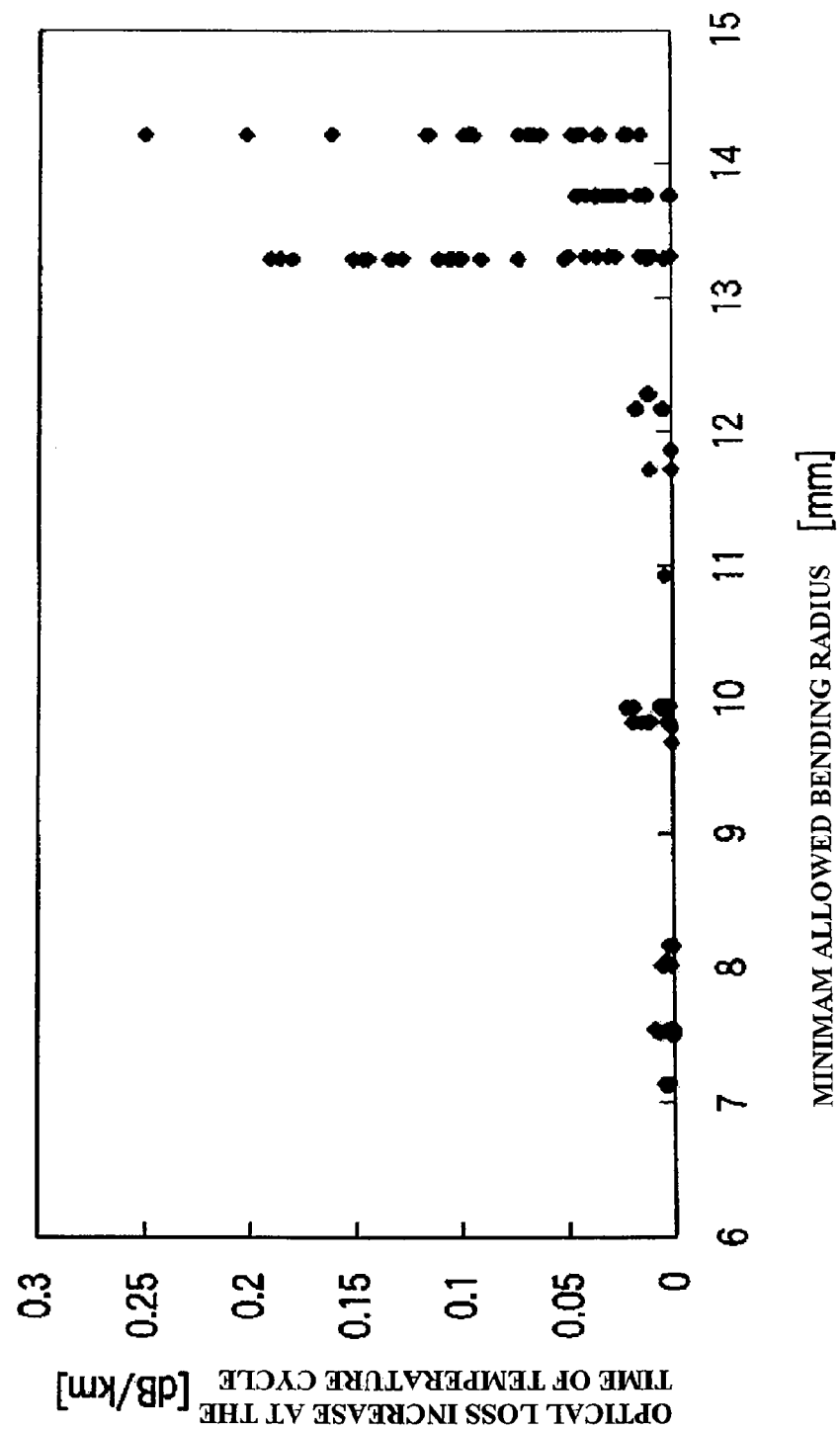
FIG. 5 is a characteristic view showing a measured result that is obtained by performing a temperature cycle test in a temperature range of −30° C. to 70° C., with respect to an optical fiber cable according to the embodiment of the invention.

FIG. 5 is a characteristic view showing a measured result that is obtained by performing a temperature cycle test in a temperature range of −30° C. to 70° C., with respect to an optical fiber cable according to the embodiment of the invention. It can be seen from FIG. 5 that the optical loss rapidly increases at the time of manufacturing the optical fiber cable, when the minimum allowed bending radius of the optical fiber increases, similar to FIG. 4. This is because the bending or the lateral pressure is applied to the optical fiber of the cable due to expansion or contraction of the cable because of the temperature change. By using the optical fiber where the minimum allowed bending radius is about 13 mm or less, a stable optical loss characteristic can be maintained, and the stable optical loss characteristic is not maintained in the other optical fiber cables.

It can be seen from FIGS. 4 and 5 that the optical fiber where the minimum allowed bending radius is 13 mm or less may be used to satisfy a condition for suppressing the optical loss increases due to the temperature change and at the time of manufacturing the optical fiber cable according to this embodiment. If the condition of the minimum allowed bending radius is satisfied about the optical loss increases with respect to bending, lateral pressure, tension, grueling, and torsion tests corresponding to general mechanical tests where the external force applied to the optical fiber cable is assumed, it is experimentally confirmed to maintain a stable optical loss characteristic.

Since the optical fiber cable according to the invention uses the optical fiber ribbon to be intermittently bonded, the optical fiber cable according to the invention is significantly different from the optical fiber cable using the mono-coated optical fiber as described in Patent Document 1 in easiness of movement of the optical fiber cable in the cable, that is, in a restrained state. Therefore the condition of the minimum allowed bending radius of the optical fiber described above is applied to only the optical fiber cable according to the invention.

As an optical fiber that has a bending loss characteristic where the minimum allowed bending radius is about 13 mm or less, for example, an optical fiber that has an optical loss increase at the time of being bent with a radius of 13 mm at the wavelength of 1.55 μm becomes 0.2 dB/10 turn or less, an optical fiber that easily confines light in a bent state, and guides the light by increasing the additive amount of germanium added to an optical fiber core or by lowering a refractive index of a clad less than that of the optical fiber core by, for example, adding fluorine is suggested. Also, a photonic crystal fiber that has a hole provided in the clad of the optical fiber, and can easily confine light in a bent state and guide the light is suggested.

Next, a warping characteristic when the optical fiber cable according to the embodiment of the invention is bent will be described in detail below.

Figure 6A:
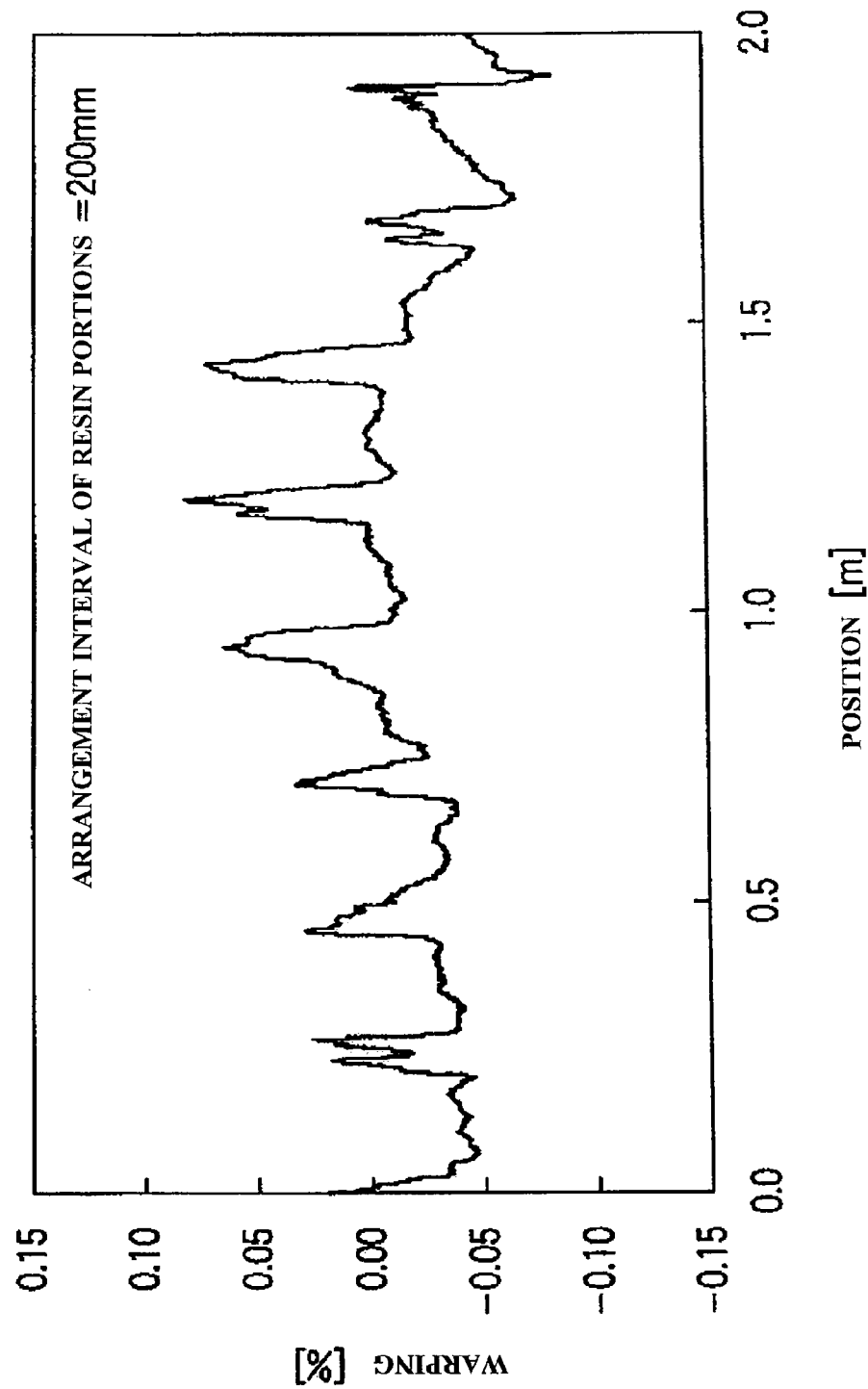
FIG. 6(a) is a characteristic view showing an example of a measured result of a distribution of warping that is applied in a longitudinal direction of an optical fiber at the time of bending an optical fiber cable according to the embodiment of the invention.

FIG. 6(a) is a characteristic view showing an example of a measured result of a distribution of warping that is applied in a longitudinal direction of an optical fiber at the time of bending an optical fiber cable according to the embodiment of the invention. For a comparison, optical fiber cables that have the same outer diameter or the size of the cable core portion and different sub-unit structures are manufactured and a measured result is shown in FIGS. 6(b) and 6(c).

Figure 6B:
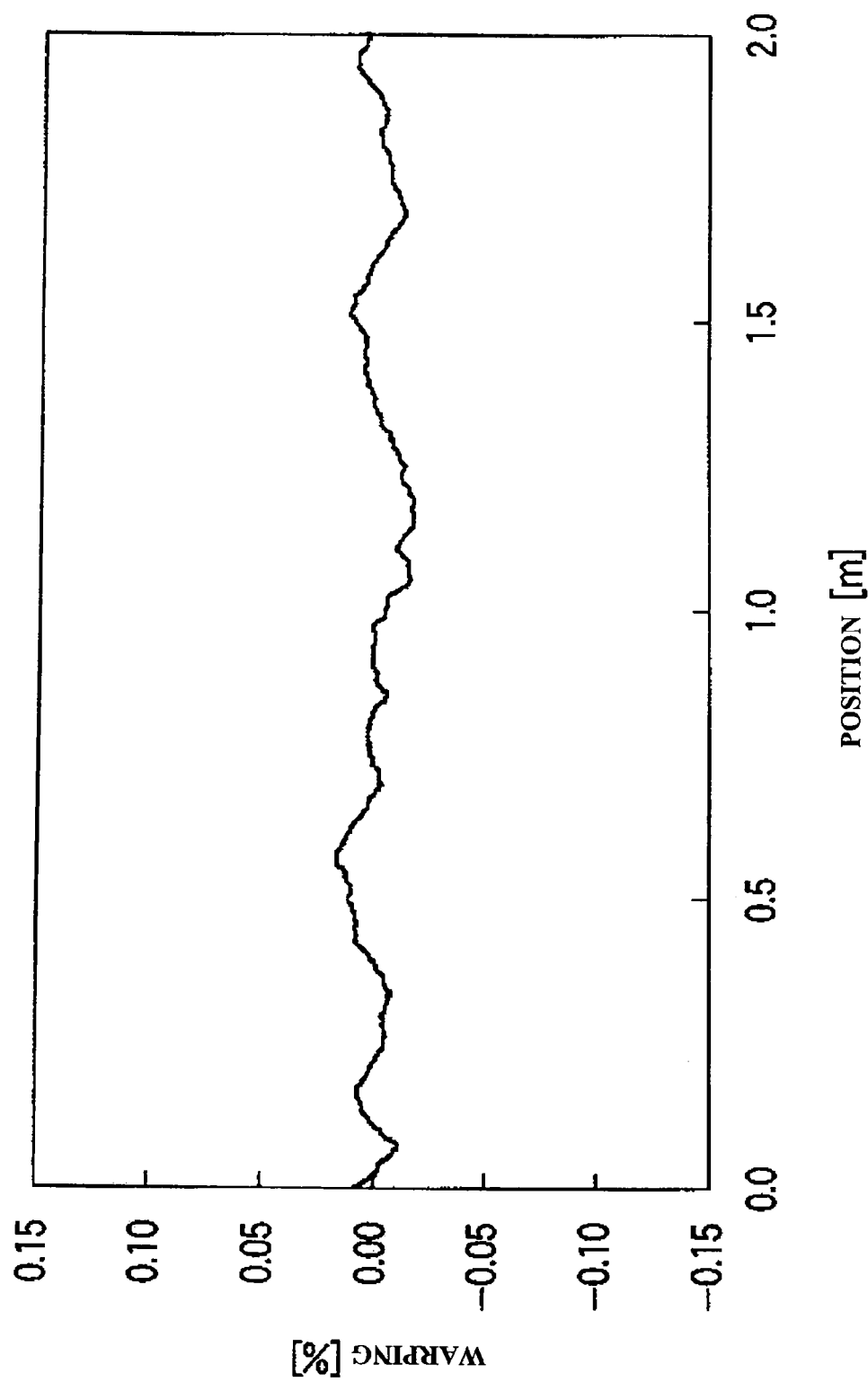
FIG. 6(b) is a characteristic view showing an example of a measured result of a distribution of warping that is applied in a longitudinal direction of an optical fiber at the time of bending an optical fiber cable according to the embodiment of the invention.
Figure 6C:
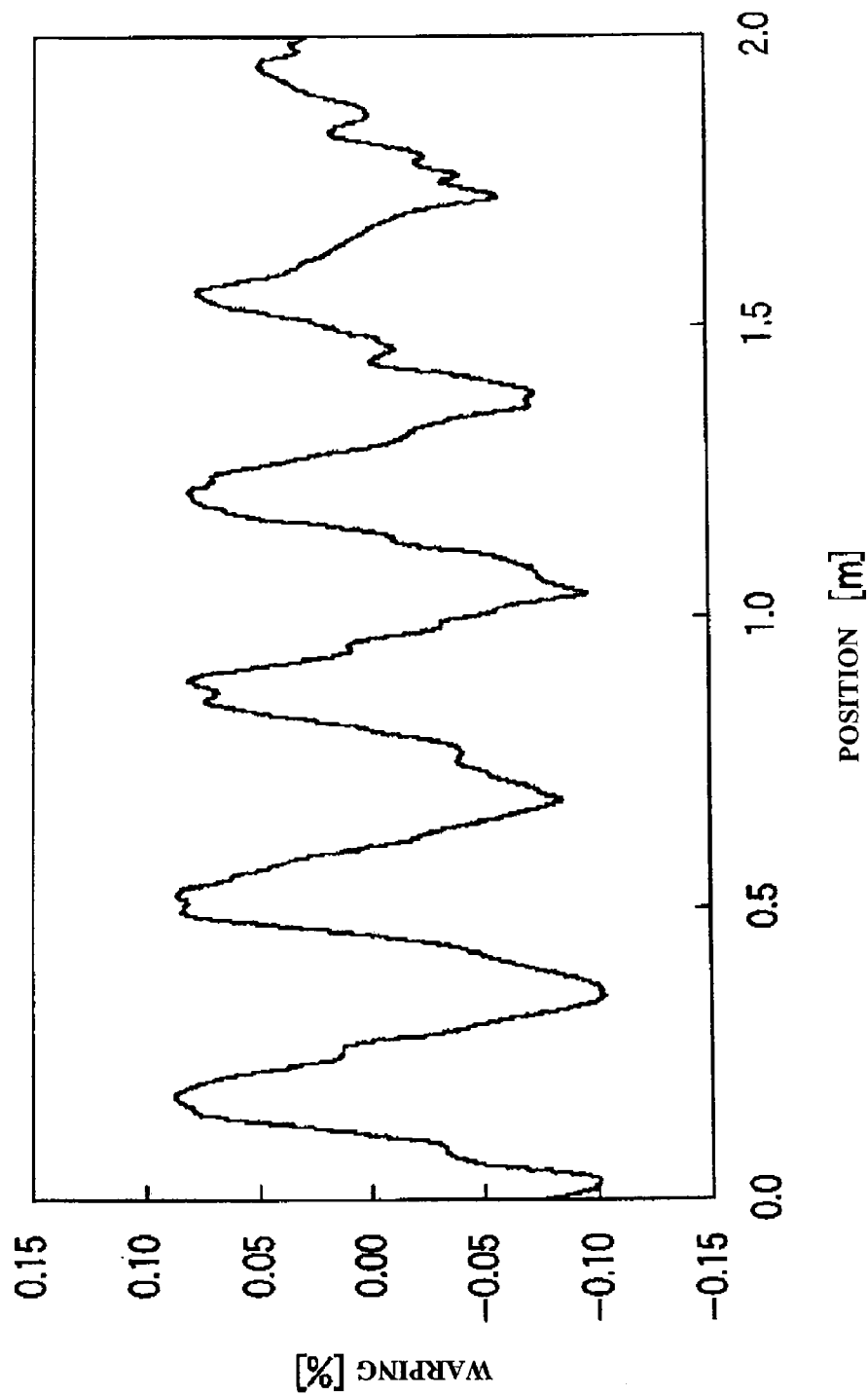
FIG. 6(c) is a characteristic view showing a measured result of a distribution of warping that is applied in a longitudinal direction of an optical fiber of a ribbon optical fiber cable at the time of bending the cable according to a comparative example of the invention.

FIG. 6(b) is a characteristic view showing a measured result of a distribution of warping that is applied in a longitudinal direction of an optical fiber of a mono-coated optical cable at the time of bending the cable according to a comparative example of the invention. FIG. 6(c) is a characteristic view showing a measured result of a distribution of warping that is applied in a longitudinal direction of an optical fiber of a ribbon optical fiber cable at the time of bending an optical fiber cable according to the comparative example of the invention.

That is, FIG. 6(b) shows the result in an optical fiber cable (hereinafter, referred to as a single optical fiber cable) that has no resin portions connecting mono-coated optical fibers, and uses a unit in which 20 mono-coated optical fibers are straightly collected. FIG. 6(c) shows the result in an optical fiber cable (hereinafter, referred to as ribbon optical fiber cable) that uses a unit in which the conventional optical fiber ribbons where the 4-fiber mono-coated optical fibers are continuously collectively coated in a longitudinal direction are straightly collected. The number of optical fibers is 200 in both cases. Further, the group bending radius is 100 mm.

It can be seen from FIG. 6(a) that warping is periodically greatly changed at the same interval as the intermittent arrangement interval of the resin portions, in the longitudinal direction of the optical fibers of the optical fiber cable according to this embodiment. That is, it can be seen that the long warping due to the cable bending is generated in the resin portions.

It can be seen from FIG. 6(b) that the warping applied in the longitudinal direction of the optical fiber of the single optical fiber cable moderately changes with a large period and the warping change amount is small.

It can be seen from FIG. 6(c) that the warping is periodically greatly changed in the longitudinal direction of the optical fibers of the ribbon optical fiber cable, similar to the FIG. 6(a). As compared with FIG. 6(a), it can be seen that the period of the warping change is long. This is to correspond to a twisting pitch of the unit in the optical fiber cable.

As such, in order to measure the warping applied to the longitudinal direction of the optical fiber with high distance resolution, for example, optical frequency domain interferometry that is described in Non-patent Document 1 is effective, and the measured distance resolution is about 20 mm or less.

Figure 7:
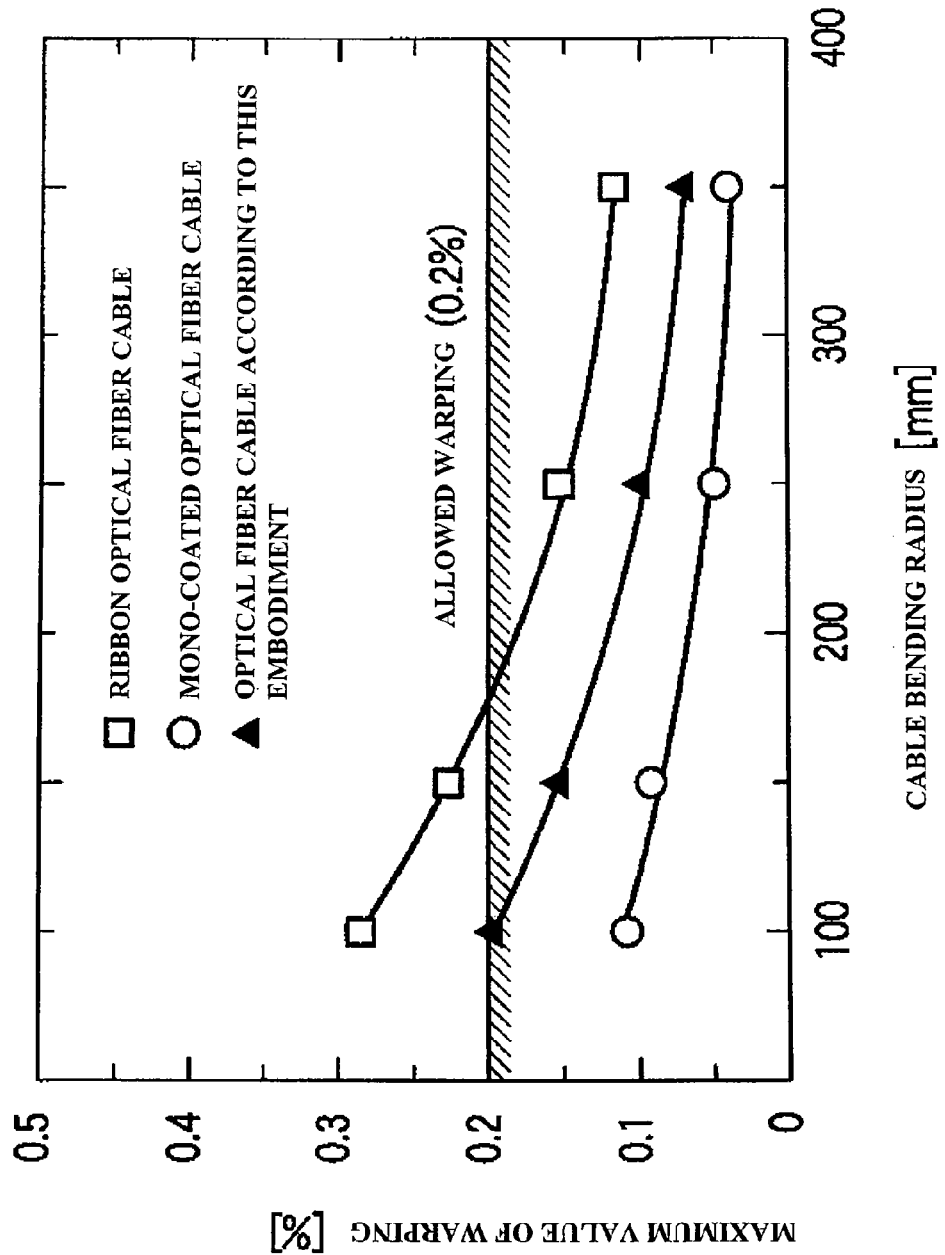
FIG. 7 is a characteristic view showing a measured result of a relationship of a cable bending radius and a maximum value of warping applied in a longitudinal direction of an optical fiber of each of an optical fiber cable, a single optical fiber cable, and a ribbon optical fiber cable, at the time of bending those cables, according to the embodiment of the invention.

FIG. 7 is a characteristic view showing a measured result of a relationship of a cable bending radius and a maximum value of warping applied in a longitudinal direction of an optical fiber of each of an optical fiber cable, a single optical fiber cable, and an optical fiber ribbon cable, at the time of bending those cables, according to the embodiment of the invention.

That is, FIG. 7 shows the result that is obtained by changing the bending radius of the optical fiber cable according to this embodiment and measuring a maximum value of warping applied in a longitudinal direction of the optical fiber. For a comparison, the results of the above-described single optical fiber cable and the ribbon optical fiber cable are also shown.

It can be seen from FIG. 7 that warping increases, as the cable bending radius decreases.

Further, it can be seen that the optical fiber cable according to this embodiment has a warping characteristic different from the warping characteristics of the ribbon optical fiber cable and the single optical fiber cable, but almost the intermediate warping characteristic of the above two cables.

In general, in the optical fiber cable where the mounting density of the cable core portion is small and the restraint of the optical fiber ribbon in the cable is weak, since the optical fiber easily moves in the cable, the difference of the warping characteristic due to the cable bending is thought to be small. However, in the optical fiber cable according to this embodiment, since the cable core portion has the extraordinarily high density, that is, Afiber/Acore is 0.3 or more, as described in FIGS. 5 and 6, the warping characteristic with respect to the cable bending is significantly different from the characteristic of the optical fiber cable having a different sub-unit structure.

Meanwhile, when the warping is applied in the longitudinal direction of the optical fiber, the rupture strength of the optical fiber is lowered.

The warping that is allowed in the optical fiber of the optical fiber cable is calculated by a proof warping amount and a fatigue coefficient n. The warping that is allowed in a quartz system optical fiber that is used in a normal environment where an n value is about needs to be about ⅓ or less of the proof warping (for example, refer to Non-patent Document 2) in order to secure reliability during a long period over 20 years. Since the proof warping of the optical fiber generally manufactured at the present time is, for example, 1.0%, the warping that is allowed in the optical fiber is about 0.3%. Also, since the warping remaining at the time of manufacturing or after laying the optical fiber cable is overlapped to the warping generated by the cable bending (about 0.1%), the warping based on the cable bending needs to be about 0.2% or less in the bending radius of the currently used cable.

In general, referring to the fact that the reference of the fixed bending radius of the cable used in actuality is tens times larger than the outer diameter D of the optical fiber cable (for example, refer to Non-patent Document 3), it can be seen that the warping is 0.2% or less in the cable bending radius 10 D (D is the short diameter of the cable in the case of the optical fiber cable according to this embodiment)=about 100 mm in the case of this embodiment, and the reliability can be secured during a long period. Meanwhile, it can be seen that, in the case of the ribbon optical fiber cable, the warping is about 0.3% in the bending radius of about 100 mm, and the reliability cannot be secured during a long period. This is because that, in the case where the optical fiber ribbon is stored in the optical fiber cable with the high density, it is difficult to control the direction of the optical fiber ribbon and the strong warping is generated when the optical fiber ribbon is bent in the width direction. For this reason, the ribbon optical fiber cable is not suitable for an optical fiber cable that is configured to have the small diameter and the high density as in the invention. That is, this means that the optical fiber cables (described in Patent Documents 2 to 4) that are stored in a state where the optical fiber ribbons are laminated are not suitable for the invention.

Next, a method that reduces the warping generated in the longitudinal direction of the optical fiber when the optical fiber cable according to this embodiment is bent will be described in detail.

When the optical fiber cable according to the embodiment is used with the small bending radius less than 10D, as a first method to satisfy the warping allowed with respect to the cable bending, it is effective to set the interval of the resin portions disposed in the longitudinal direction of the mono-coated optical fibers to be long, set the length of the resin portion to be smaller than 80 mm, and decrease the restraint received by the mono-coated optical fiber in the optical fiber ribbon. That is, it is effective to decrease a ratio (0.4 in this embodiment) of the length of the resin portion to the interval of the resin portions disposed in the longitudinal direction of the mono-coated optical fiber. It can be easily thought that this means the bundle of mono-coated optical fiber when the ratio decreases, and means the optical fiber ribbon when the ratio increases, that is, when the ratio increases approximately to 1.

The first method that reduces the warping can improve workability at the time of single optical fiber separation work for separating a desired optical fiber from the optical fiber ribbon and connecting the desired optical fiber and another optical fiber. Since the optical fiber cable according to this embodiment uses an optical fiber where the optical loss increase with respect to the bending is reduced as compared with the normal optical fiber, the optical loss increase of the optical fiber ribbon during the single fiber separating work can be suppressed, and hot line work is enabled.

As a second method that reduces the warping, it is effective to use a resin where the Young's modulus is low, that is, extension exists as a resin used in the resin portion. Specifically, if a material where the Young's modulus after hardening is lower than the Young's modulus (about 250 to 1500 MPa, for example, refer to Patent Document 6) after hardening the outermost coated resin of the mono-coated optical fiber, for example, a resin (the Young's modulus after hardening is about 5 to 100 MPa, for example, refer to Patent Document 6) used in the primary coated layer of the conventional mono-coated optical fiber is used, the warping that is generated in the longitudinal direction when the optical fiber cable is bent can be alleviated.

The second method that reduces the warping can separate the optical fiber such that the strong external force is not applied to the mono-coated optical fiber at the time of the single fiber separating work, and the bending or the optical loss increase of the mono-coated optical fiber can be suppressed.

The invention is not limited to the embodiment and the components can be modified and specified without limiting the scope of the invention in the embodiment step. Various inventions can be generated by appropriately combining the plural components disclosed in the embodiment. For example, some components may be removed from all of the components described in the embodiment. Further, the components according to a different embodiment may be appropriately combined.

Second Embodiment

An embodiment of the present invention will be described in detail with reference to the accompanying drawings. FIG. 8(*a*) is a cross-sectional view showing an example of an optical fiber ribbon according to the first embodiment of the invention. FIG. 8(*b*) is a cross-sectional view showing another example of the optical fiber ribbon according to the first embodiment of the invention. In FIGS. 8(*a*), 11, 12, 13, and 14 denote mono-coated optical fibers and 15, 16, and 17 denote connecting portions.

As shown in FIG. 8(*a*), plural (n) mono-coated optical fibers, for example, 4-fiber mono-coated optical fibers 11, 12, 13, and 14 with the outer diameter d (μm) are arranged. The mono-coated optical fibers 11, 12, 13, and 14 are disposed apart from each other, such that they do not contact each other, and the adjacent mono-coated optical fibers 11, 12, 13, and 14 are continuously connected in a longitudinal direction, by (n−1), that is, three connecting portions 15, 16, and 17.

Among the three connecting portions, 15, 16, and 17, at least (n/2−1), that is, one connecting portion 16 is composed of resin with the thickness b (μm) and the length h (μm). At this time, the thickness b of the connecting portion 16 is equal to or smaller than the outer diameter d of each of the mono-coated optical fibers 11, 12, 13, and 14, and b≤d is satisfied.

In general, the plural optical fiber ribbons using the n (=4 or 8) mono-coated optical fibers are used. As described in the first embodiment, the optical fiber of the mono-coated optical fiber is measured by a measuring method defined in "IEC 60793-1-47 edition2 (2006-09) "Optical fibers-part1-47 Measurement methods and test procedure-Macrobending loss", and preferably has a bending loss characteristic in which an optical loss increase at the time of being bent with the radius of 13 mm at the wavelength of 1.55 μm becomes 0.2 dB/10 turn or less.

As an index of easiness of buckling when the optical fiber ribbon receives a compressive load in a width direction, buckling stress is exemplified. For simple calculation, if a beam that has a rectangle section, the length h, and both ends fixed by rotation ends is assumed, the bucking stress has the magnitude of the stress when a constant stress is applied and large flexure is rapidly generated, and is generally represented by an equation (2-1).

$$\sigma = \pi^2 EI/ha \qquad (2\text{-}1)$$

In this case, E denotes the Young's modulus of a material of the connecting portion 16, I denotes a sectional secondary moment composed of the thickness b and the depth of the connecting portion 16, and A denotes a sectional area of the connecting portion 16. If the depth v (μm) that is the constant length in a longitudinal direction of the optical fiber ribbon is assumed, the sectional secondary moment I and the sectional area A μm of the connecting portion 16 are given by equations (2-2) and (2-3).

$$I = vb^3/12 \qquad (2\text{-}2)$$

$$A = vb \qquad (2\text{-}3)$$

In order to study the optimal length h of the connecting portion 16 when the outer diameter d of each of the mono-coated optical fibers 11, 12, 13, and 14 or the thickness b of the connecting portion 16 changes, a ratio of $S_s$ when d or b changes to b=d where the buckling stress becomes strongest and the bucking stress $S_{b=d}$ of the beam where h is minimum, that is, $S_s/S_{b=d}$ is calculated, and is compared with the result obtained by a bucking experiment of the actually manufactured optical fiber ribbon. In this case, h of the minimum value that is used when $S_{b=d}$ is calculated is set to 10 μm in consideration of a current state where the arrangement pitch of the adjacent optical fibers is about d+several tens μm, in the conventionally used optical fiber ribbon.

As the experimental result, in a sample of $S_s/S_{b=d} \leq 0.1$, an optical fiber ribbon where deformation is easy as compared with a sample of b=d is obtained. For this reason, a relationship between the outer diameter d of each of the mono-coated optical fibers 11, 12, 13, and 14 which is able to realize $S_s/S_{b=d} \leq 0.1$ or less and the thickness b and the length h of the connecting portion 16 is calculated.

In FIGS. 8(b), 21, 22, 23, 24, 25, 26, 27, and 28 denote mono-coated optical fibers and 31, 32, 33, 34, 35, 36, and 37 denote connecting portions. As shown in FIG. 8(b), the n (=8) mono-coated optical fibers 21 to 28 with the outer diameter d (μm) are arranged. The mono-coated optical fibers 21 to 28 are disposed apart from each other, such that they do not contact each other, and the adjacent mono-coated optical fibers 21 to 28 are continuously connected in a longitudinal direction, by (n−1), that is, seven connecting portions 31 to 37.

Among the seven connecting portions 31 to 37, at least (n/2−1), that is, three connecting portions 32, 34, and 36 are composed of resin with the thickness b (μm) and the length h (μm). At this time, the thickness b of each of the connecting portions 32, 34, and 36 is equal to or smaller than the outer diameter d of each of the mono-coated optical fibers 21 to 28, and b≤d is satisfied.

Figure 9:
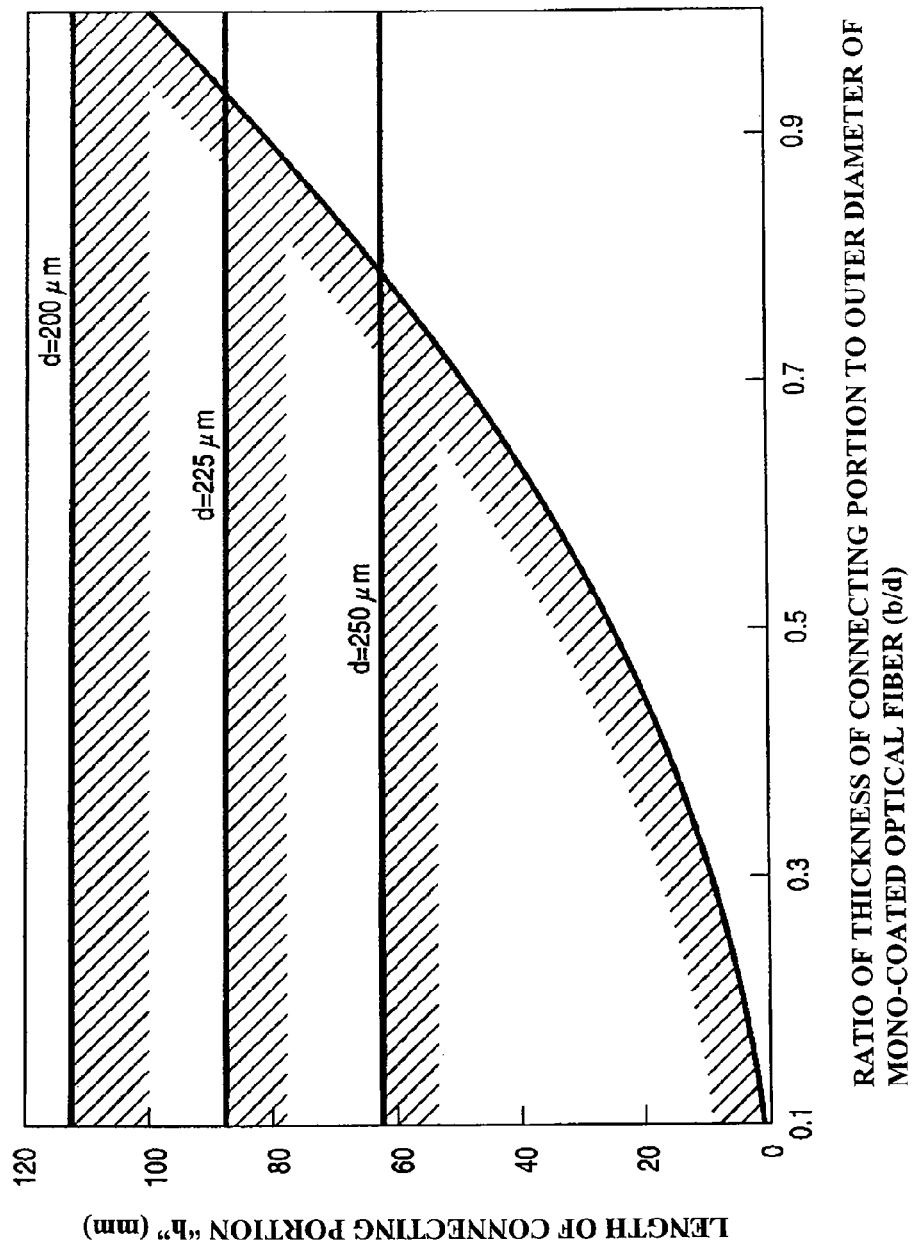
FIG. 9 is a characteristic view showing a relationship of a ratio (b/d) of the thickness of a connecting portion and the length h (μm) of the connecting portion with respect to the outer diameter of a mono-coated optical fiber used in the embodiment of the invention.

FIG. 9 is a characteristic view showing a relationship of a ratio (b/d) of the thickness of a connecting portion to the outer diameter of a mono-coated optical fiber used in the embodiment of the invention and the length h (μm) of the connecting portion. That is, FIG. 9 shows a range of the length h of the connecting portion that can be easily deformed, with respect to the ratio (b/d) of the outer diameter d of the mono-coated optical fiber and the thickness b of the connecting portion. In FIG. 9, a curved line can be easily calculated using the equation (1) and the relationship of $S_s/S_{b=d} \leq 0.1$, and is represented as h≥100(b/d)^2.

For example, when b/d is 0.5, this means a connecting portion that has the thickness b that is ½ of the outer diameter d of the mono-coated optical fiber. At this time, the needed length h of the connecting portion becomes about 25 μm or more. If the outer diameter d of the mono-coated optical fiber is small, the length h of the connecting portion can be increased even in the same arrangement pitch.

Meanwhile, since an original object is to collectively connect the multiple optical fiber ribbons in a mass-splicing machine, there is a limitation in increasing the arrangement pitch to increase the length h of the connecting portion.

As a reference of the maximum arrangement pitch that enables the collective connection of the multiple optical fibers, when considering that the V groove (optical fiber array) having the groove pitch of 250 μm described in Non-patent Document 4 is used in an optical fiber aligning mechanism of the mass-splicing machine is used, if at least half of the outer diameter (125 μm) of a nude optical fiber where coating is removed is located in the desired V groove, the optical fibers can be aligned in the desired V groove by pressing on the optical fiber aligning mechanism, and collective connection is enabled. Therefore, in the optical fiber ribbon according to the embodiment of the invention, the maximum arrangement pitch of the adjacent optical fibers becomes 250 μm+125/2 μm=312.5 μm. For this reason, a maximum value of the length h of the connecting portion needs to be set to 312.5−d (μm).

Accordingly, an optical fiber ribbon where the length h of the connecting portion is given as a function of the thickness b of the connecting portion and the outer diameter d of the mono-coated optical fiber, a shape is easily deformed in a range of 100 (b/d)^2≤h≤312.5−d (a unit is μm), and the arrangement pitch of the optical fibers enabling the collective connection of the multiple optical fibers is set can be realized.

Figure 10:
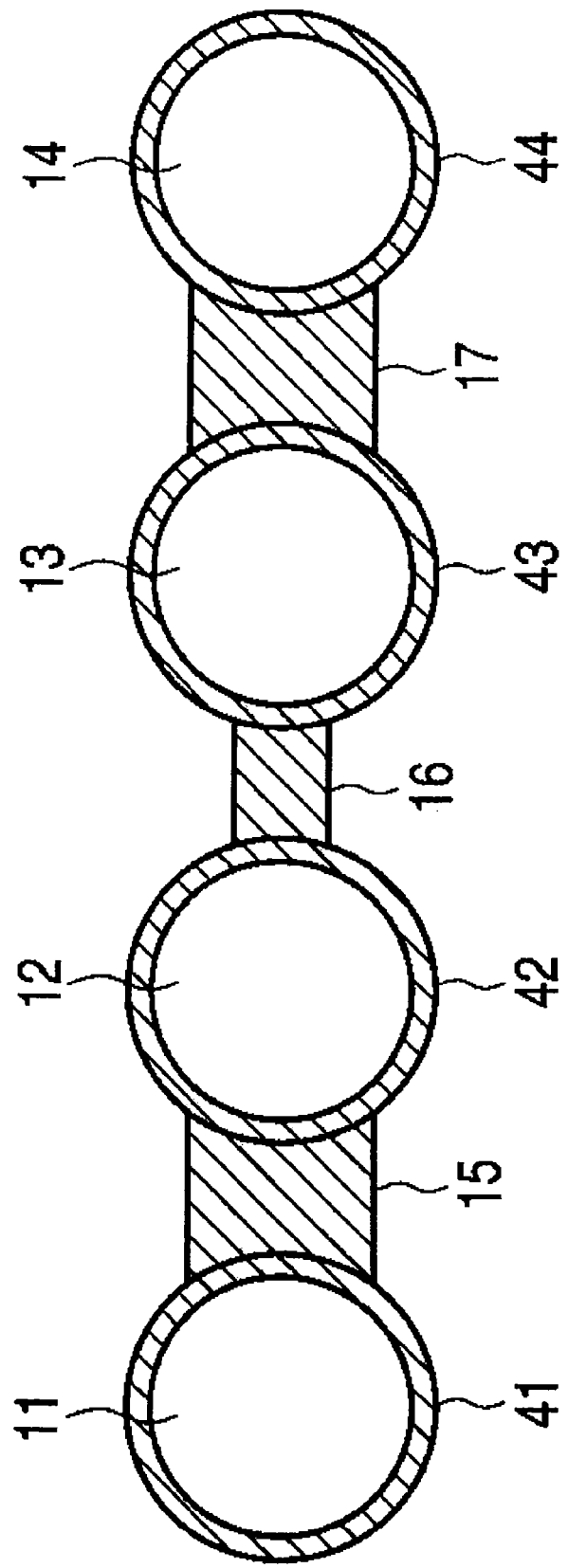
FIG. 10 is a cross-sectional view showing an optical fiber ribbon according to a second embodiment of the invention.

FIG. 10 is a cross-sectional view showing an optical fiber ribbon according to a second embodiment of the invention. In FIG. 10, the same portions as those of FIG. 8(a) are denoted by the same reference numerals and the description is omitted. In FIGS. 10, 41, 42, 43, and 44 denote layers.

As shown in FIG. 10, a structure where the same material as that of the connecting portions 15, 16, and 17, for example, the resin remains around the mono-coated optical fibers 11 to 14 to form the layers 41 to 44 may be used. In this case, since a contact area of the resin layers 41 to 44 and the mono-coated optical fibers 11 to 14 increases, the resin of the connecting portions 15, 16, and 17 can be prevented from being removed at the interface of the mono-coated optical fibers 11 to 14, when the optical fiber ribbon is buckled.

Figure 12A:
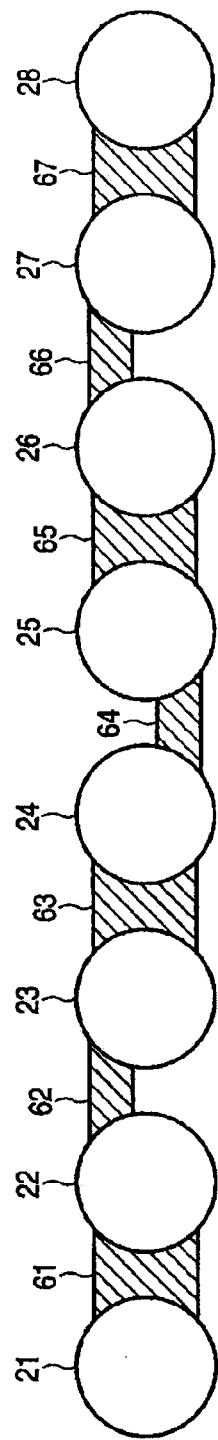
FIG. 12(a), (b), and (c) are cross-sectional views showing another example of an optical fiber ribbon according to the third embodiment of the invention.
Figure 12B:
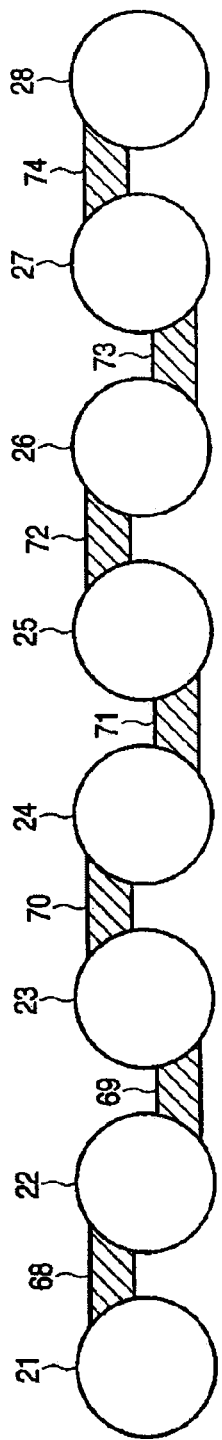
Figure 12C:
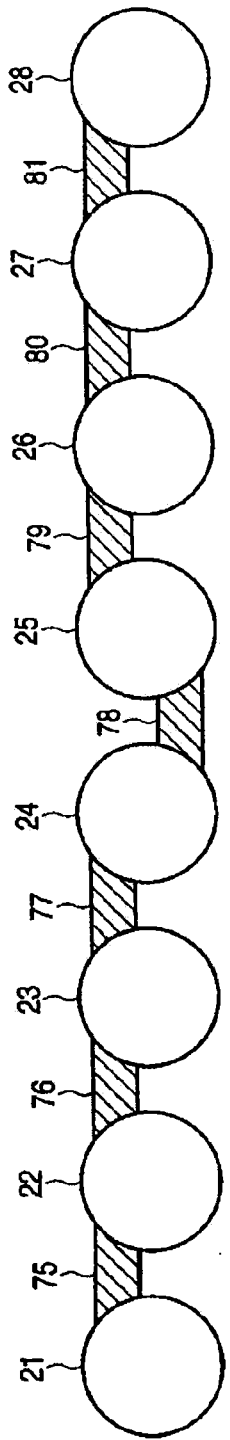

FIGS. 11(a), (b), and (c) are cross-sectional views showing an example of an optical fiber ribbon according to a third embodiment of the invention. FIG. 12(a), (b), and (c) are cross-sectional views showing another example of the optical fiber ribbon according to the third embodiment of the invention. In FIGS. 11(a), (b), and (c), 11 to 14 denote mono-coated optical fibers and 51 to 59 denote connecting portions. In FIGS. 12(a), (b), and (c), 21 to 28 denote mono-coated optical fibers and 61 to 81 denote connecting portions.

As shown in FIGS. 11(a), (b), and (c) and FIG. 12(a), (b), and (c), in the width direction of the optical fiber ribbon, the connecting portions 51 to 59 and 61 to 81 are disposed in a state where the arrangement positions thereof are shifted in the thickness direction of the optical fiber ribbon.

That is, the connecting portions 54, 56, 57, 62, 66, 68, 70, 72, 74, 75, 76, 77, 79, 80, and 81 are shifted and disposed on the side higher than a line connecting the centers of the mono-coated optical fibers 11 to 14 and 21 to 28 in the thickness direction of the optical fiber ribbon, and the connecting portions 52, 55, 59, 64, 69, 71, 73, and 78 are shifted and disposed on the side lower than a line connecting the centers of the mono-coated optical fibers 11 to 14 and 21 to 28 in the thickness direction of the optical fiber ribbon.

With this structure, when the compressive load is received in the width direction of the optical fiber ribbon, the bending moment is applied to the connecting portions, and the optical fiber ribbon is easily folded.

The conventional optical fiber ribbon has the structure that the resin having the high Young's modulus of about 500 MPa to 1 GPa is used to integrally cover all of the plural mono-coated optical fibers arranged in parallel, the buckling is not generated even though the compressive load of some degree is received in the width direction of the optical fiber ribbon, and the mono-coated optical fiber is rarely bent.

As the material of at least (n/2−1) connecting portions of the optical fiber ribbon according to the embodiment of the invention, the resin that has the low Young's modulus and the strong fractural warping is used, and the connecting portions are rarely removed and fractured when the optical fiber ribbon is buckled. Specifically, the resin that has the Young's modulus after hardening less than 500 MPa, is particularly used in the primary coating layer of the mono-coated optical fiber, has the strong fractural warping at all times, is superior in elongation, and has the low Young's modulus of 10 MPa or less is preferably used.

Meanwhile, since the optical fiber ribbon according to the embodiment of the invention is easily buckled in the width direction, in order to obtain a superior transmission characteristic even when the optical fiber ribbon is buckled in the width direction in the optical fiber cable, an optical fiber where the loss with respect to the bending of the optical fiber is reduced is preferably used.

As the optical fiber where the loss generated due to the bending is reduced, an optical fiber that easily confines light in the optical fiver core even in a bent state and guides the light by increasing the additive amount of germanium added to an optical fiber core or making a refractive index of a clad lower than that of the optical fiber core by, for example, adding fluorine is suggested.

Also, a photonic crystal fiber that has a hole provided in the clad of the optical fiber, and therefore it can easily confine light in the optical fiver core even in a bent state and guide the light is suggested. With this structure, an optical fiber having an optical loss characteristic where an optical loss increase becomes 0.2 dB/10 turn or less even in a bending radius of 15 mm can be obtained.

Figure 13:
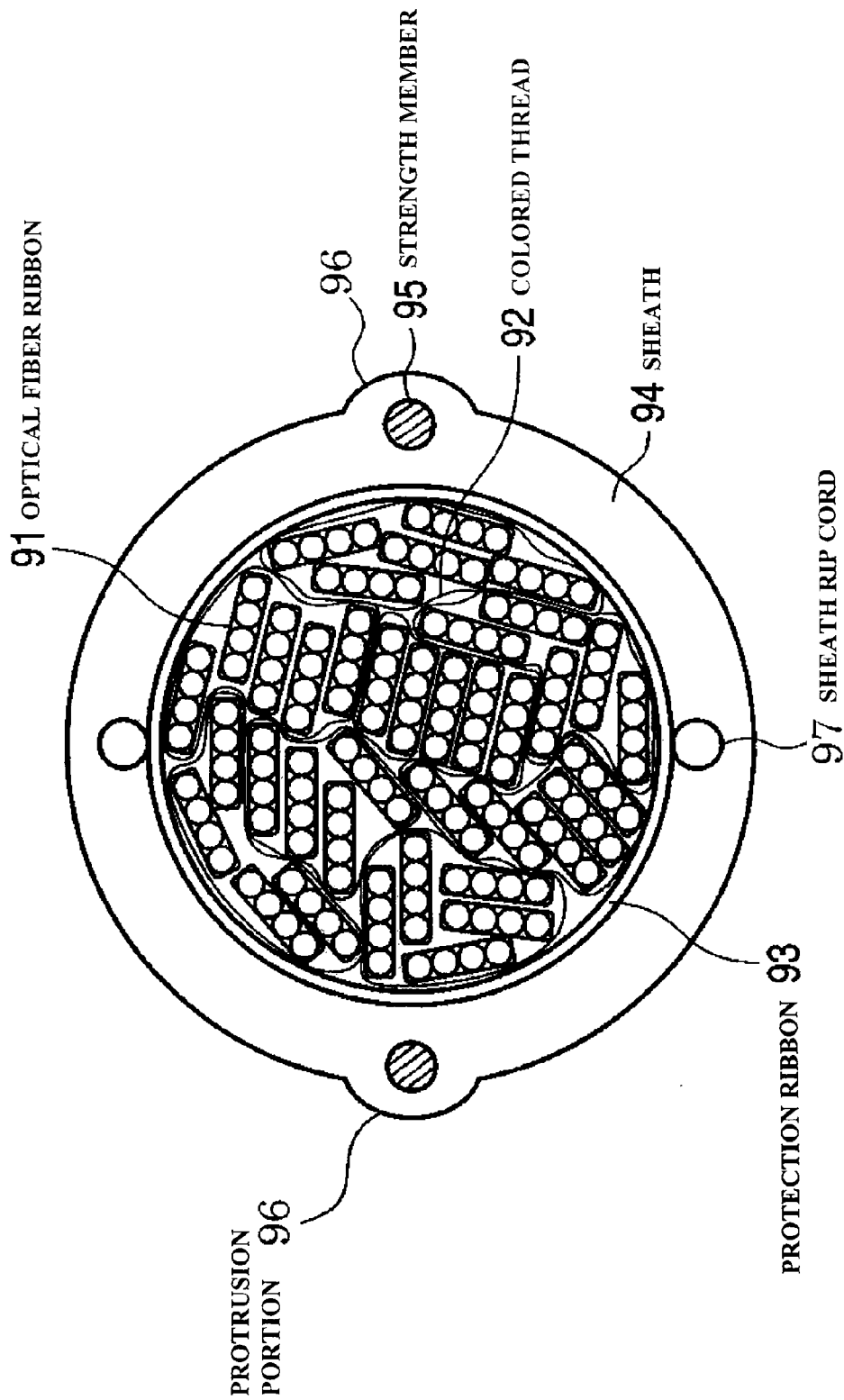
FIG. 13 is a cross-sectional view showing an optical fiber cable according the embodiment of the invention.

FIG. 13 is a cross-sectional view showing an optical fiber cable according to the embodiment of the invention. In FIG. 13, 91 denotes an optical fiber ribbon according to the embodiment of the invention, 92 denotes a colored thread, 93 denotes a protection ribbon, 94 denotes a sheath, 95 denotes a strength member, and 97 denotes a sheath rip cord.

As shown in FIG. 13, units each of which is configured by winding a colored thread 92 around the outer circumference of an optical fiber ribbon bundle where plural optical fiber ribbons 91 each composed of four mono-coated optical fibers, for example, four or five optical fiber ribbons are straightly and densely collected are formed, a protection ribbon 93 having a wrapping layer that is composed of the plural thin protection ribbons is formed on the outer circumference of a portion where the plural units, for example, two units composed of four optical fiber ribbons 91 and six units composed of five optical fiber ribbons 91 are twisted in one direction and densely collected, a sheath 94 is then applied to the outer circumference of the protection ribbon 93, and a multiple optical fiber cable of 152 fibers with the very high density is configured.

As another example, units each of which is configured by winding a colored thread around the outer circumference of an optical fiber ribbon bundle where five optical fiber ribbons each composed of four mono-coated optical fibers are straightly and densely collected are formed, a cable core portion having a wrapping layer that is composed of plural thin protection ribbons is formed on the outer circumference of a portion where the 10 units are twisted in one direction and densely collected, a sheath is applied to the outer circumference of the cable core portion, and a multiple optical fiber cable of 200 fibers with the very high density is configured.

The optical fiber cable according to the embodiment of the invention includes two strength members 95 and a sheath 94. The two strength members 95 are buried in the sheath 94 such that the strength members are disposed at the positions symmetrical to each other, with respect to the center of the optical fiber cable, and the thickness of the sheath 94 of a portion (protrusion portion) where the strength members 95 are buried is larger than the thickness of the sheath 94 of the other portion.

In the above description, the plural unit are twisted in one direction, but the invention is not limited thereto. For example, the optical fiber cable may be an optical fiber cable with an SZ-slotted rod that has an untwisted portion in an opposite direction in the intermediate portion.

In regards to the outer diameter of the optical fiber cable according to the embodiment of the invention, the long diameter that is measured by the protrusion portion is, for example, 11.7 mm, the short diameter D that is measured at portions other than the protrusion portion is, for example, 9.7 mm, and the thickness of the sheath other than the protrusion portion is 1.9 mm. An area Acore of the portion where the optical fiber is stored, that is, the cable core portion is calculated from $((D-1.9\times2)/2)^2\times\pi$, and for example, is 27.3 mm², and an area Afiber that is occupied by the 200 mono-coated optical fibers is calculated from the following relationship.

$$A\text{fiber}=n\times(d/2)^2\times\pi \quad (2\text{-}4).$$

In this case, n means the number (=200) of optical fibers in the optical fiber cable, d means the outer diameter (for example, 0.25 mm) of the mono-coated optical fiber, and λ means a circumstance ratio.

Accordingly, the area Afiber that is occupied by the plural mono-coated optical fibers according to the embodiment of the invention becomes 9.82 mm². A ratio of the area Afiber occupied by the plural mono-coated optical fibers with respect to the area Acore of the cable core portion becomes Afiber/Acore≈0.36.

As the result that is obtained by manufacturing the optical fiber cable where the optical fibers are mounted with the maximum density in the same structure in actuality, Afiber/Acore that can be realized is about 0.3 to 0.55 in an optical fiber cable having 100 to 1000 optical fibers.

As the above, in the optical fiber cable where the optical fiber ribbons are mounted with the very high density in which Afiber/Acore is 0.3 or more, the density is high to a degree to which it is difficult to laminate, for example, the optical fiber ribbons, that is, align and mount the optical fiber ribbons, and the optical fiber ribbons are stored in a random direction as shown in FIG. 13, different from the optical fiber cables described in Patent Documents 2 to 4. For this reason, when the optical fiber cable according to the embodiment of the invention is bent, the optical fiber ribbons that receive the lateral pressure in the width direction and are bent exist, and excessive distortion is easily applied to the optical fibers in the related optical fiber ribbon.

However, in the optical fiber cable using the optical fiber ribbons according to the embodiment of the invention, in a state of the optical fiber cable where the sheath is applied, even though the lateral pressure of the width direction is applied to the optical fiber ribbon stored therein when the cable is bent, the optical fiber ribbon is easily deformed, and the distortion can be alleviated.

Also, in a step in which the cable core portion is formed, since the optical fiber ribbon according to the embodiment of the invention is easily deformed in the width direction, the units can be formed in a folded state, and the cable can be manufactured in the same way as the bundle of mono-coated optical fibers. The optical fiber cable according to the embodiment of the invention is different from the optical fiber cable described in Patent Document 6 in that the former uses the optical fiber ribbons having a continuously uniform structure in the longitudinal direction, and the former is a highly manufacturable, therefore, is economical.

In the optical fiber cable where Afiber/Acore is small and the restraint in the optical fiber ribbon in the cable is weak, the difference of the distortion characteristic due to the cable bending is normally set to be small to easily move the optical fiber in the cable. However, in the optical fiber cable according to the embodiment of the invention, the cable core portion has the very high density, that is, Afiber/Acore is 0.3 or more. Therefore, the distortion characteristic with respect to the cable bending is significantly different from the characteristic of the optical fiber cable where the conventional optical fiber ribbon is mounted.

The invention is not limited to the above embodiments, and the components can be deformed and specified without limiting the scope of the invention in the embodiment step. Further, various inventions can be formed by appropriately combining the plural components disclosed in the embodiments. For example, some components may be removed from the components described in the embodiments. The components may also be appropriately combined over different embodiments.

Third Embodiment

Figure 15:
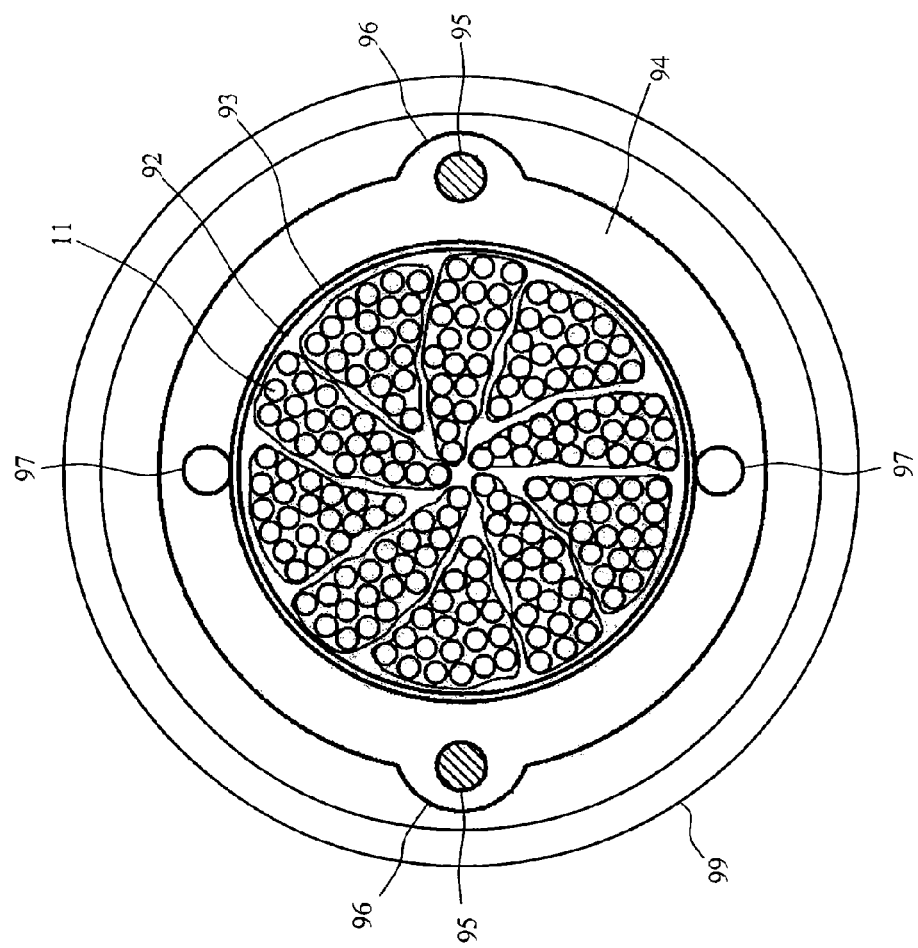
FIG. 15 is a diagram illustrating an optical fiber cable including a metallic tube.
Figure 16:
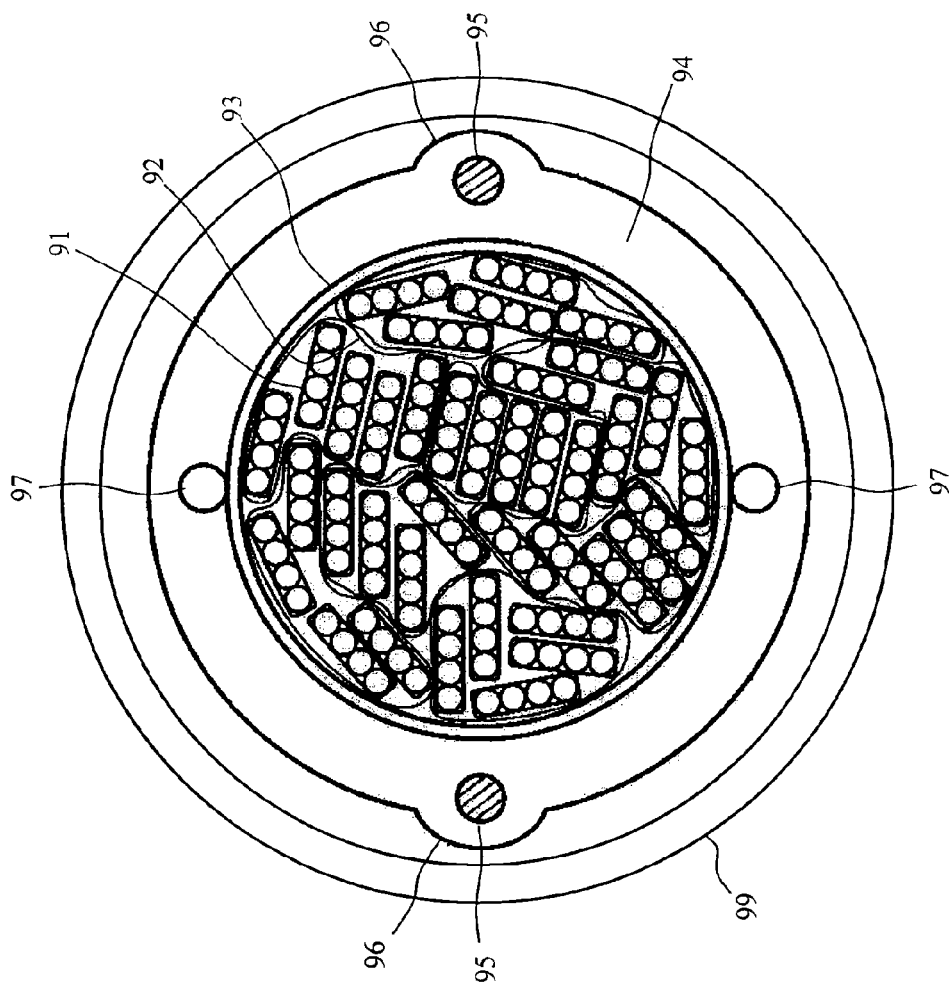
FIG. 16 is a diagram illustrating an optical fiber cable including a metallic tube.

The optical fiber cable that is described in FIG. 1 or 13 further includes a lateral pressure protection layer composed of a metallic tube 99 at the outer circumference of the sheath 94. The metallic tube 99 can be configured as a corrugated tube where corrugating working is performed. FIG. 15 shows the case where the optical fiber cable described in FIG. 1 includes the metallic tube 99. FIG. 16 shows the case where the optical fiber cable described in FIG. 13 includes the metallic tube 99. In the optical fiber cable shown in FIG. 15 or 16, since the metallic tube 99 becomes a buckler with respect to the cable lateral pressure, the metallic tube 99 can be directly buried in the ground without being installed in a conduit.

EXPLANATIONS OF REFERENCE NUMERALS 11, 12, 13, 14, 21 to 28: mono-coated optical fiber
15, 16, 17, 31 to 37, 51 to 81: connecting portion
41 to 44: layer
18: resin portion
19: non-resin portion
91: optical fiber ribbon
92: colored thread
93: protection ribbon
94: sheath
95: strength member
96: protrusion portion
97: sheath rip cord

What is claimed is:

1. An optical fiber cable that includes optical fiber ribbons composed of 3-fiber or more mono-coated optical fibers coated at the outer circumference of optical fibers, wherein the optical fiber cable comprising:
   (a) a cable core portion having:
      (i) a plurality of units that are twisted in one direction and collected, wherein each of said units is configured with:
         (1) a bundle of three or more mono-coated optical fibers,
            wherein said bundle has a first resin portion that bonds an adjacent pair of said optical fibers at a first place, and a second resin portion that bonds said adjacent pair at a second place,
            wherein said first and second resin portions are separated from one another by a length of a non-resin portion that does not bond said adjacent pair, and
            wherein each of said first resin portion and said second resin portion has a length that is shorter than said length of said non-resin portion; and
         (2) a colored thread wound around an outer circumference of said bundle; and
      (ii) a wrapping layer wound around an outer circumference of said plurality of units; and
   (b) a sheath around an outer circumference of said cable core portion.

2. The optical fiber cable of claim 1, wherein the resin portions that are adjacent to each other in the width direction of the optical fiber ribbons are disposed apart from each other in the longitudinal direction of the optical fiber ribbons.

3. The optical fiber cable of claim 1, wherein a ratio of the length of the resin portions to an interval of the resin portions disposed in the longitudinal direction of the mono-coated optical fibers is 0.4 or less.

4. The optical fiber cable of claim 1, wherein the length of the resin portions is 80 mm or less.

5. The optical fiber cable of claim 1, wherein a material that has the Young's modulus smaller than that of a material used in an outermost coating layer of the mono-coated optical fiber is used as a material of the resin portion.

6. The optical fiber cable of claim 1, wherein the optical fiber ribbon has a portion where there is no resin portion in the width direction of the optical fiber ribbon, and the length of the portion is 50 mm or less.

7. The optical fiber cable of claim 1, wherein the optical fiber is a photonic crystal fiber that has a hole in a clad portion.

8. The optical fiber cable of claim 1, wherein the optical fiber ribbons are divided into groups of the plurality of adjacent mono-coated optical fibers, and the resin portions have an identification function for identifying the groups.

9. The optical fiber cable of claim 8,
wherein the identification function of the resin portions is realized by a structure in which an interval of the resin portions disposed in the longitudinal direction of the mono-coated optical fibers between the adjacent groups and an interval of the resin portions disposed in the longitudinal direction of the mono-coated optical fibers in the groups are different from each other.

10. The optical fiber cable of claim 8,
wherein the identification function of the resin portions is realized by discrimination of colors colored with respect to the resin portions.

11. An optical fiber cable comprising:
(1) a plurality of units that are twisted and collected, wherein each of said units is configured with:
 (a) a bundle of optical fiber ribbons, wherein each of said optical fiber ribbons includes:
  (i) a quantity of n mono-coated optical fibers, where n is a natural number greater than or equal to 2, and
  (ii) a quantity of (n−1) connecting portions disposed apart from each other to cause said optical fibers to not contact each other, and continuously connecting adjacent ones of said optical fibers in a longitudinal direction,
  wherein:
   (A) in at least (n/2−1) of said connecting portions, a thickness of each of said at least (n/2−1) connecting portions is set to b,
   (B) an outer diameter of each of said optical fibers is set to d,
   (C) a relation between b and d is b≤d, and
   (D) a length h of each of said at least (n/2−1) connecting portions is in a range of 100 (b/d)^2≤h≤312.5 μm−d, and
   wherein each of b, d and h is in units of μm; and
 (b) a colored thread wound around an outer circumference of said bundle; and
(2) a wrapping layer wound around an outer circumference of said plurality of units.

12. The optical fiber cable of claim 11,
wherein resin that has the Young's modulus after hardening less than 500 MPa is used as a material of at least (n/2−1) connecting portions among the plural connecting portions.

13. The optical fiber cable of claim 11,
wherein a layer that has the same material as the connecting portions is formed around the mono-coated optical fibers.

14. The optical fiber cable of claim 11,
wherein the connecting portions are disposed to be shifted in a thickness direction of the optical fiber ribbon more than a line connecting the centers of the mono-coated optical fibers.

15. The optical fiber cable of claim 11,
wherein the optical fiber is a photonic crystal fiber that has a hole in a clad portion.

16. The optical fiber cable of claim 1,
wherein the optical fiber has a bending loss characteristic in which an optical loss increase at the time of being bent with a radius of 13 mm at the wavelength of 1.55 nm becomes 0.2 dB/10 turn or less.

17. The optical fiber cable of claim 1,
wherein a ratio of a sectional area occupied by the plural mono-coated optical fibers to a sectional area of the cable core portion is 0.3 or more.

18. The optical fiber cable of claim 1, further comprising:
two strength members that are buried in the sheath to be disposed symmetrical to each other with respect to the center of the cable core portion,
wherein the thickness of the sheath of a portion where the strength members are buried is larger than the thickness of the sheath of the other portion.

19. The optical fiber cable of claim 1, further comprising:
a lateral pressure protection layer that is composed of a metallic tube at the outer circumference of the sheath.

20. The optical fiber cable of claim 19,
wherein said metallic tube is a corrugated tube where corrugating working is performed.

21. The optical fiber cable of claim 11,
wherein the optical fiber has a bending loss characteristic in which an optical loss increase at the time of being bent with a radius of 13 mm at the wavelength of 1.55 μm becomes 0.2 dB/10 turn or less.

22. The optical fiber cable of claim 11, further comprising:
a cable core portion that stores twisting of the plural units,
wherein a ratio of a sectional area occupied by the plural mono-coated optical fibers to a sectional area of the cable core portion is 0.3 or more.

23. The optical fiber cable of claim 11, further comprising:
a cable core portion that stores twisting of the plural units,
a sheath that is applied to an outer circumference of the cable core portion,
two strength members that are buried in the sheath to be disposed symmetrical to each other with respect to the center of the cable core portion,
wherein the thickness of the sheath of a portion where the strength members are buried is larger than the thickness of the sheath of the other portion.

24. The optical fiber cable of claim 11, further comprising:
a cable core portion that stores twisting of the plural units,
a sheath that is applied to an outer circumference of the cable core portion,
a lateral pressure protection layer that is composed of a metallic tube at the outer circumference of the sheath.

25. The optical fiber cable of claim 24,
wherein said metallic tube is a corrugated tube where corrugating working is performed.

* * * * *